US012246465B1

(12) United States Patent
Dovel

(10) Patent No.: US 12,246,465 B1
(45) Date of Patent: Mar. 11, 2025

(54) FOLDING KNIFE, FOLDING KNIFE KIT, KNIFE KIT, AND METHODS

(71) Applicant: Darex, LLC, Ashland, OR (US)

(72) Inventor: Daniel T. Dovel, Shady Cove, OR (US)

(73) Assignee: Darex, LLC, Ashland, OR (US)

( * ) Notice: Subject to any disclaimer, the term of this patent is extended or adjusted under 35 U.S.C. 154(b) by 0 days.

(21) Appl. No.: 18/822,651

(22) Filed: Sep. 3, 2024

Related U.S. Application Data

(60) Provisional application No. 63/582,415, filed on Sep. 13, 2023.

(51) Int. Cl.
*B26B 5/00* (2006.01)
*F16C 19/10* (2006.01)

(52) U.S. Cl.
CPC ............. *B26B 5/00* (2013.01); *F16C 19/10* (2013.01); *F16C 2314/00* (2013.01)

(58) Field of Classification Search
None
See application file for complete search history.

(56) References Cited

U.S. PATENT DOCUMENTS

| | | | | |
|---|---|---|---|---|
| 5,722,168 A | * | 3/1998 | Huang ................. | B23D 51/01 30/160 |
| 7,246,441 B1 | * | 7/2007 | Collins ................ | B26B 1/048 30/159 |
| 9,505,141 B2 | * | 11/2016 | Duey ................... | B26B 1/048 |
| 9,527,218 B2 | * | 12/2016 | Valdez ................. | B26B 1/044 |
| 9,862,104 B2 | * | 1/2018 | France ................. | B26B 1/048 |
| 2008/0201953 A1 | * | 8/2008 | Bremer ................ | B26B 1/046 30/160 |

FOREIGN PATENT DOCUMENTS

CN  212096432 U  12/2020

OTHER PUBLICATIONS

"Rike Tulay + Civivi Asticus Full Review & Disassembly!!!!," Retrieved from https://www.youtube.com/watch?v=NJ6Le2AYePQ, Retrieved on Nov. 23, 2023, pp. 3.

* cited by examiner

*Primary Examiner* — Hwei-Siu C Payer
(74) *Attorney, Agent, or Firm* — Workman Nydegger

(57) ABSTRACT

A folding knife includes a handle, a blade, and first and second bearing pivots. The handle has first and second bearing apertures that open to an exterior of the handle. The blade is disposable at least partially within the handle and between the first and second bearing apertures. The first and second bearing pivots are insertable respectively into the first and second bearing apertures. Each of the first and second bearing pivots includes a thrust bearing surface, and at least one of the first and second bearing pivots includes a radial bearing surface about which the blade is configured to rotate. At least one of the first and second bearing pivots is selectively replaceable from the exterior of the handle to convert the knife between manual and automatic functions.

19 Claims, 17 Drawing Sheets

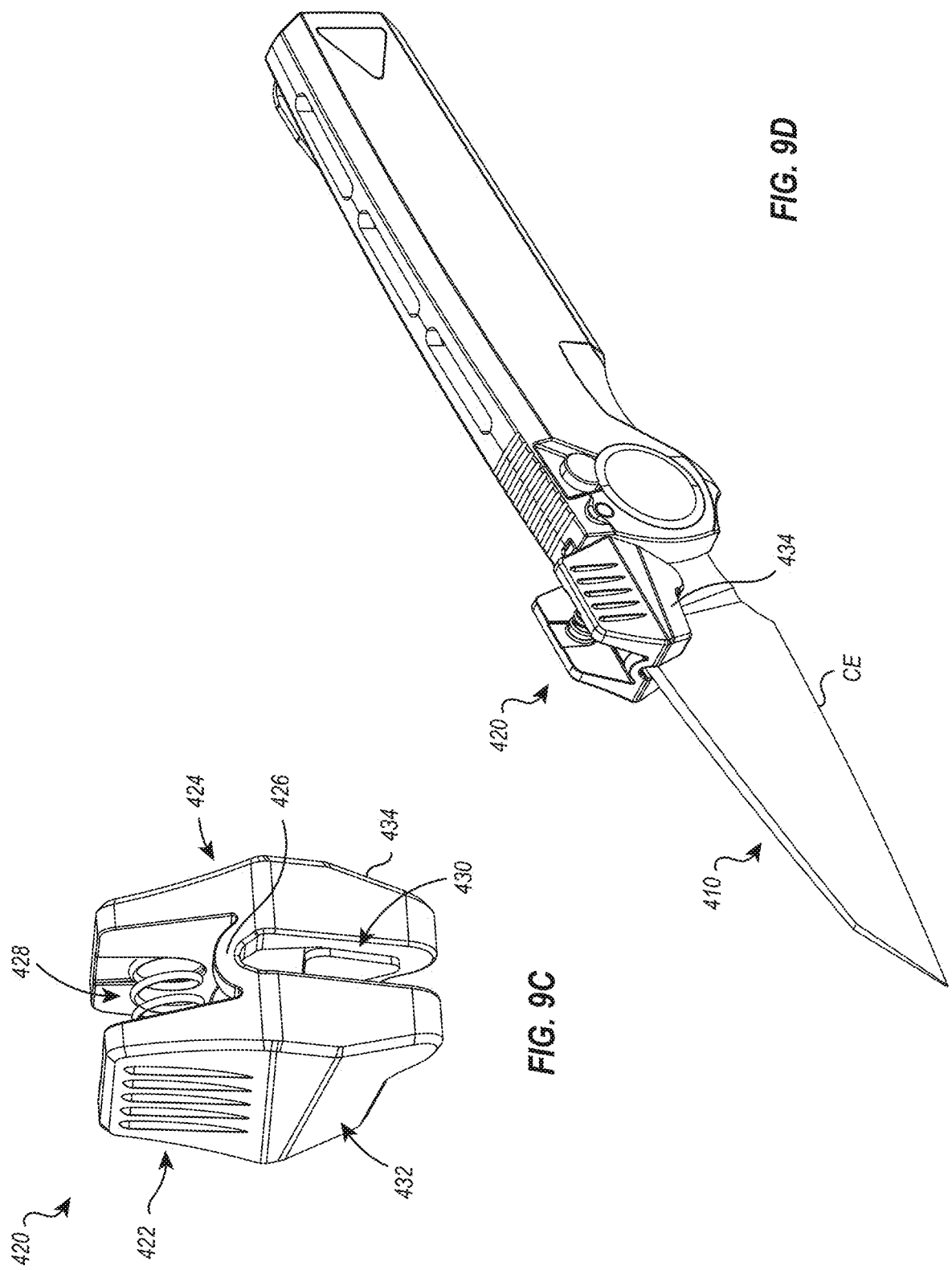

FOLDING KNIFE, FOLDING KNIFE KIT, KNIFE KIT, AND METHODS

CROSS-REFERENCE TO RELATED APPLICATIONS

This application claims the benefit of and priority to U.S. Patent Provisional Application No. 63/582,415, filed Sep. 13, 2023, and titled Modular Folding Knife, the entire content of which is incorporated herein by reference.

BACKGROUND

Most conventional folding knife designs employ a stacked or sandwiched construction in which the blade is captured inside one or more layers of a handle on each side of the blade. The blade and the inner surfaces of the handle may have corresponding thrust surfaces that engage one another. In other cases, thrust bearings or thrust washers are positioned between the blade and the inners surfaces of the handle. In either case, the lateral position of the blade within the handle is referenced to an inner surface of the handle. The blade also includes an aperture therethrough through which a pin is inserted and about which the blade rotates. In order for the blade to fold/rotate smoothly, both the pivot (radial) and thrust bearing surfaces must be of a suitable bearing material and very precisely produced to ensure smooth action of the blade.

In conventional folding knife construction, the washers or bearings are assembled between the sides of the blade and the inner surfaces of the handle and a pivot fastener is installed through this assembly. This makes changing the action (i.e., speed or smoothness of opening) difficult and requires significant disassembly. Changing the function (i.e., from manual opening to automatic opening) generally is not feasible or requires modification, significant disassembly, and/or replacement of multiple components. The assembly of these types of folding knives is also complicated in that the blade and washers or bearings need to be installed inside the handle slot and getting all parts aligned (handle, blade, and washers) in order to insert the pivot pin.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

FIGS. 9A-9E illustrate various alignment and sharpening features for a folding knife according to one example embodiment of the present disclosure.

DETAILED DESCRIPTION

Figure 1A:
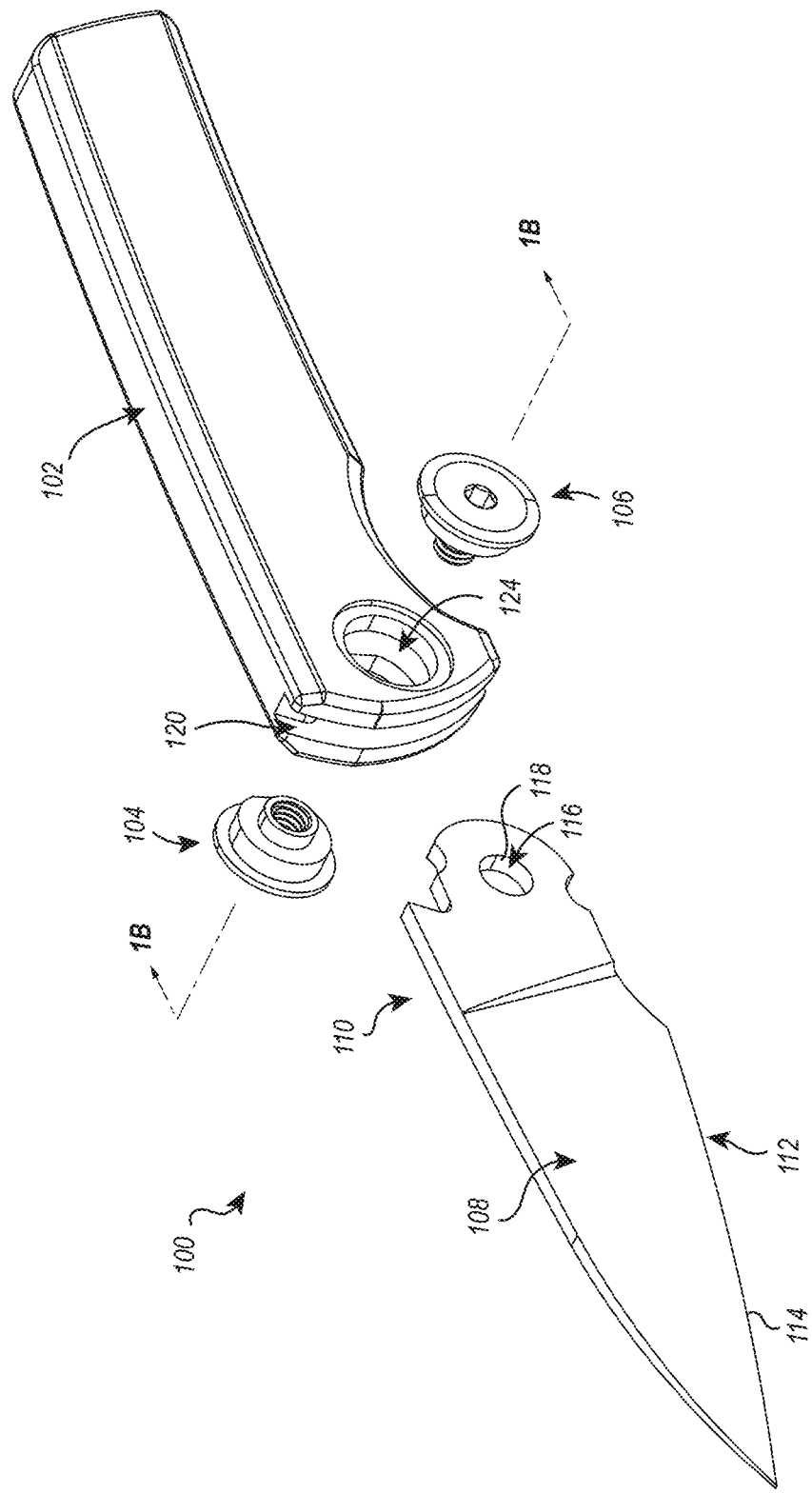
FIG. 1A illustrates an exploded view of a folding knife according to one example embodiment of the present disclosure.

Modular folding knife designs of the present disclosure allow for easy assembly and service from the outside of the handle. Blade, bearings (or washers), lock mechanisms, and spring mechanisms can all be assembled from the outside of the handle. Pivots, bearings, and spring mechanisms can easily be adjusted or changed to provide different actions or functions without disassembling the handle assembly. The various pivots, bearings, and spring mechanisms disclosed herein may also be referred to individually and collectively as action assemblies, action components, function assemblies, and function components. The designs disclosed herein further include features to reduce the cost and complexity of manufacturing and assembling a one piece handle (integral) knife design.

In general, modular folding knives of the present disclosure include externally assembled pivot hardware and bearings or bearing surfaces that are integrated into the pivot hardware. This allows for reduced part counts, improved performance, and easier assembly and maintenance. The advantages of this construction include reduced production and assembly cost, improved action and blade centering, easy assembly/disassembly/maintenance while providing a more robust design, including fewer parts that affect the position and action of the blade.

In some embodiments, a knife according to the present disclosure includes a handle and a folding blade with a blade locating feature. A pair of bearing pivots are adjustable to a desired clearance with opposing sides of the blade by a fastener. The pair of bearing pivots retain the blade within the handle. The bearing pivots include thrust bearing surfaces that contact opposing sides of the blade or bearing ring(s) disposed between the blade and the thrust bearing surfaces on the bearing pivots. Bearing rings may be further described as thrust bearings. Types of applicable thrust bearings may include steel or ceramic ball bearings, roller or needle bearings, nylon or bronze washers, etc. At least one of the bearing pivots also includes a radial bearing surface establishing the axis of pivot for the blade. Flanges or other engagement surfaces are formed on the bearing pivots to locate the bearing pivots relative to the handle. The relative positioning between the bearing pivots and the handle also impact the positioning of the blade relative to the handle. The engagement surface on at least one of the bearing pivots can also retain a lock button. The lock button may be spring biased to engage open and closed lock features (e.g., detents) in the blade. A stop pin may provide a reinforced stop for the blade in the open position. A pocket clip and opposing pocket clip retainer may be located in opposing recesses in the handle and retained to each other by a fastener. The pocket clip and retainer may be reversable to permit the clip to be positioned on either side of the handle.

To manually deploy or stow the blade, a user may grasp the handle with a first hand, momentarily depresses the lock button, and then move the blade between open or closed positions. The lock button is spring biased to engage the blade lock features when the blade is brought into the desired position. The blade can be moved using the user's second hand (two hand opening) or by quickly moving the handle while the lock button is depressed to "flick" the blade open or closed (one hand opening). One hand manual opening can be accomplished by momentum forces on the blade from moving the handle or by gravity pulling the blade open when the handle is oriented accordingly. In some embodiments of this disclosure, the action can easily be altered because the modular bearing pivots can be adjusted (e.g., how tightly they are pressed against the blade) or exchanged (ball bearing pivot for gravity or fixed thrust bearing for momentum or two hand opening).

The function can also be changed to automatically deploy the blade. One bearing pivot can be exchanged for an automatic bearing pivot that contains a torsion spring that engages the blade and biases the blade towards the open position. In this case, a user may grasp the handle with one hand and deploys the blade by momentarily pressing the lock button. The torsion spring will force the blade open and into contact with the stop pin. At that point, the compression spring of the lock will push the lock button to engage the blade lock feature and lock the blade open.

Figure 1B:
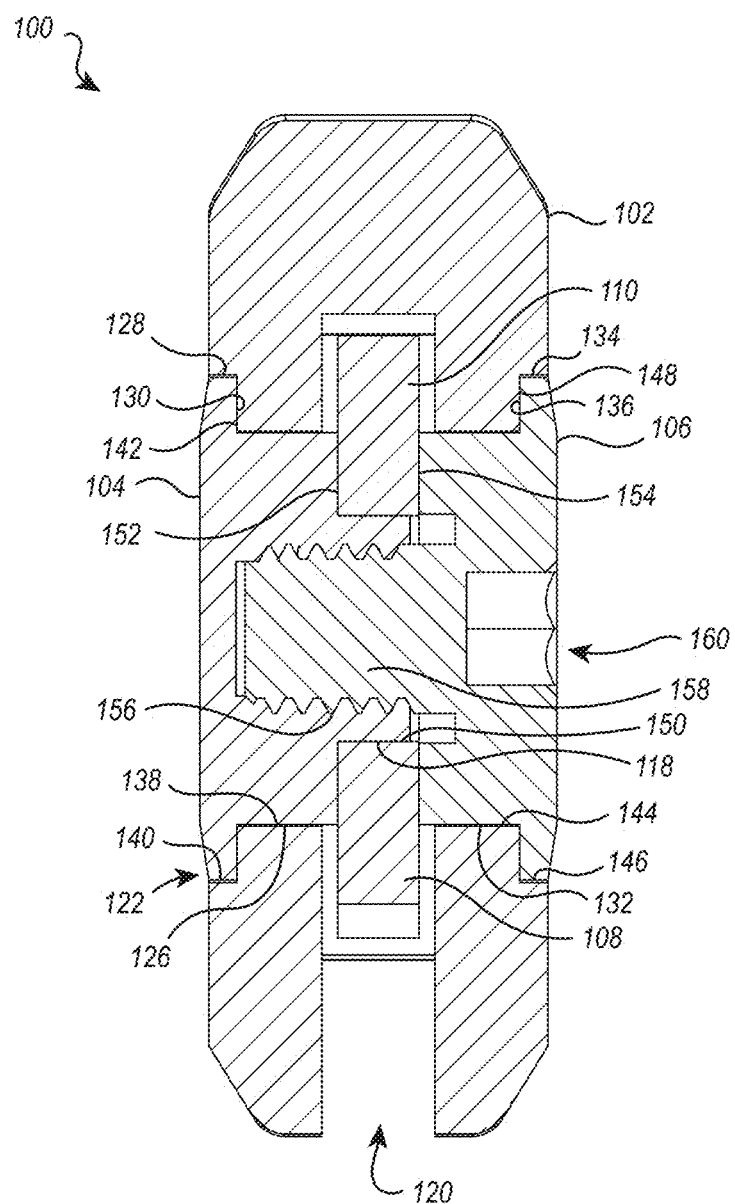
FIG. 1B illustrates a cross-sectional view of the folding knife of FIG. 1A when assembled.

Attention is now directed to FIGS. 1A and 1B, which illustrate exploded and cross-sectional views of a modular knife 100 according to one example embodiment of the present disclosure. In the illustrated embodiment, the knife 100 includes a handle 102, a first bearing pivot 104, a second bearing pivot 106, and a blade 108. It will be noted that although the knife 100 may include other elements (e.g., locking elements, etc.), such elements are not illustrated or described in connection with FIGS. 1A and 1B for the sake of simplicity.

The first and second bearing pivots 104, 106 may be referred to individually as "action components" or "function components" and collectively as "action assemblies" or "function assemblies." In the illustrated embodiment, the first and second bearing pivots 104, 106 form a manual function assembly. In some embodiments, a manual function requires a user to manually move the blade 108 from a closed or folded configuration to an open configuration (as shown in FIG. 1A). This may require the user to hold the handle 102 with one hand and move the blade 108 with a second hand to open the knife 100. The bearing pivots may further be described as a pivot module comprising an assembled module of components/features that may include various action and/or function components contained within the pivot module.

As can be seen in the Figures, blade 108 includes a tang 110 and a distal portion 112. The distal portion 112 has a cutting edge 114. The tang 110 includes a bearing aperture 116 extending therethrough between opposing sides thereof. The bearing aperture 116 has an inner dimension that is defined by a radial bearing surface 118.

The handle 102 includes a slot 120 therein that is sized and arranged to receive at least a portion of the tang 110 therein. The handle 102 also includes a first bearing aperture 122 in a first side of the handle 102 and a second bearing aperture 124 in a second side of the handle 102. The first and second bearing apertures 122, 124 having openings that open to the exterior of the handle 102 and to the slot 120.

The first bearing aperture 122 includes a stepped bore configuration with surfaces 126, 128 of different radial dimensions. A shoulder 130 is formed between the surfaces 126, 128. Similar to the first bearing aperture 122, the second bearing aperture 124 includes a stepped bore configuration with surfaces 132, 134 of different radial dimensions and a shoulder 136 formed therebetween.

The exterior of the first bearing pivot 104 includes a stepped configuration with surfaces 138, 140 and a shoulder 142. The surfaces 138, 140 and the shoulder 142 are sized, shaped, and otherwise configured to nest within and/or engage the surfaces 126, 128 and the shoulder 130. Likewise, the exterior of the second bearing pivot 106 includes a stepped configuration with surfaces 144, 146 and a shoulder 148. The surfaces 144, 146 and the shoulder 148 are sized, shaped, and otherwise configured to nest within and/or engage the surfaces 132, 134 and the shoulder 136.

The bearing pivots 104, 106 also include one or more bearing surfaces. For instance, the first bearing pivot 104 include a radial bearing surface 150. The radial bearing surface 150 has an outer dimension that corresponds to the inner dimension of the bearing aperture 116 in the blade 108. That is, the radial bearing surface 150 is sized to fit within the bearing aperture 116 and allow for the blade 108 to rotate thereabout without significant play therebetween.

The first bearing pivot 104 also has a thrust bearing surface 152. In the illustrated embodiment, the thrust bearing surface 152 is formed as a shoulder between the surface 138 and the radial bearing surface 150. Similarly, the second bearing pivot 106 includes a thrust bearing surface 154. As shown, the thrust bearing surface 154 may be a shoulder formed adjacent to the surface 144.

As shown in FIG. 1B, the first and second bearing pivots 104, 106 are configured to extend through the bearing apertures 122, 124 and into the slot 120. The thrust bearing surfaces 152, 154 are configured to engage directly against opposing side surfaces of the tang 110 of the blade 108. As a result, the tang 110 may be sandwiched between the thrust bearing surfaces 152, 154 of the first and second bearing pivots 104, 106.

The bearing pivots 104, 106 may also include connection features to facilitate connection therebetween. In the illustrated embodiment, the bearing pivot 104 includes a threaded bore 156 and the bearing pivot 106 includes a threaded projection 158. The threaded projection 158 may be threaded into the threaded bore 156 to secure the bearing pivots 104, 106 together with the blade 108 between the thrust bearing surfaces 152, 154. To facilitate the threaded engagement, one or both of the bearing pivots 104, 106 may include an exterior facing drive feature 160. The drive feature 160 may be a recess or projection that is configured to be engaged by a tool to facilitate relative rotation between the bearing pivots 104, 106.

To assemble the knife 100, the tang 110 of the blade 108 is inserted into the slot 120 such that the bearing aperture 116 of the tang 110 is aligned with the first and second bearing apertures 122, 124. The first and second bearing pivots 104, 106 are inserted into the first and second bearing apertures 122, 124 and secured together. Inserting the first bearing pivot 104 will result in the radial bearing surface 150 being inserted into the bearing aperture 116 in the tang 110.

Additionally, the thrust bearing surfaces 152, 154 on the bearing pivots 104, 106 will engage with opposing side surfaces of the blade 108. The shoulders 142, 148 of the bearing pivots 104, 106 will similarly engage the shoulders 130, 136 in the first and second bearing apertures 122, 124, thereby limiting how far into the first and second bearing apertures 122, 124 the bearing pivots 104, 106 can be inserted.

Notably, when the knife 100 is assembled, the opposing sides of the tang 110 may not engage with the interior surfaces of the slot 120. As a result, the lateral position of the blade 108 with the slot 120 may not be dictated by the interior surfaces of the slot 120. Rather, the lateral position of the blade 108 within the slot 120 may be dictated by the positions of the thrust bearing surfaces 152, 154. In the illustrated embodiment, the positions of the thrust bearing surfaces 152, 154 may be referenced from or dictated by exterior facing surfaces of the handle 102. For instance, the engagement between the surfaces 130/142, 136/148 may dictate the lateral positions of the bearing pivots 104, 106, which will dictate the lateral positions of the thrust bearing surfaces 152, 154 and the blade 108. Thus, the lateral position of the blade 108 may be referenced from one or more exterior facing surface of the handle 102.

The bearing pivots 104, 106 may be constructed of an appropriate bearing material. The pivot pivots 104, 106 may serve as fasteners (e.g., to secure the components of the knife 100 together), bearing surfaces, and the primary load bearing members. The thrust and radial bearing surfaces 150, 152, 154 are located on the bearing pivots 104, 106 so the handle 102 requires no precise internal machining operations (e.g., the handle 102 does not require internal location or bearing surfaces). In addition to reducing the number of components, this construction permits the handle 102 to be made from a wide range of materials including soft metals, plastics, and even wood.

The construction of the knife 100 results in an easy to assemble knife. For instance, all of the components of the knife 100 are assembled from the outside the handle 102 as opposed to stacked on top of each other or inserting multiple components into a common handle slot. The moving components of the knife 100 can be removed, cleaned, serviced, or replaced without disassembling the handle 102. The external bearing pivots 104, 106 also provide increased strength by spreading the forces across a larger area of the handle 102, thereby allowing for non-metal handle construction without the need for adding steel liners to reinforce the structure.

While the bearing pivots 104, 106 are shown and described with the radial bearing surface 150 being entirely part of the bearing pivot 104, this is only one example. In other embodiments, the radial bearing surface 150 may be included as part of the bearing pivot 106. In still other embodiments, the radial bearing surface 150 may be divided between the bearing pivots 104, 106 such that the radial bearing surface 118 is only fully formed when the bearing pivots 104, 106 are secured together.

The above described and illustrated manner in which the bearing pivots 104, 106 are connectable together is also only one example. In other embodiments the threaded bore and threaded projection may be switched between the bearing pivots. In other embodiments, the threaded projection may be separate from the bearing pivots. For instance, one of the bearing pivots may include a bore therethrough that is configured to receive a fastener (e.g., screw) therethrough. The fastener may extend through the bore and threadedly engage a threaded bore in the other bearing pivot to secure the bearing pivots together. The bearing apertures shown are cylindrical, circular sections extending through the body. Other apertures may include combinations of planar and/or curved edges extending through the body. The corresponding bearing pivots may have surfaces that engage the sides of the bearing aperture.

Figure 2A:
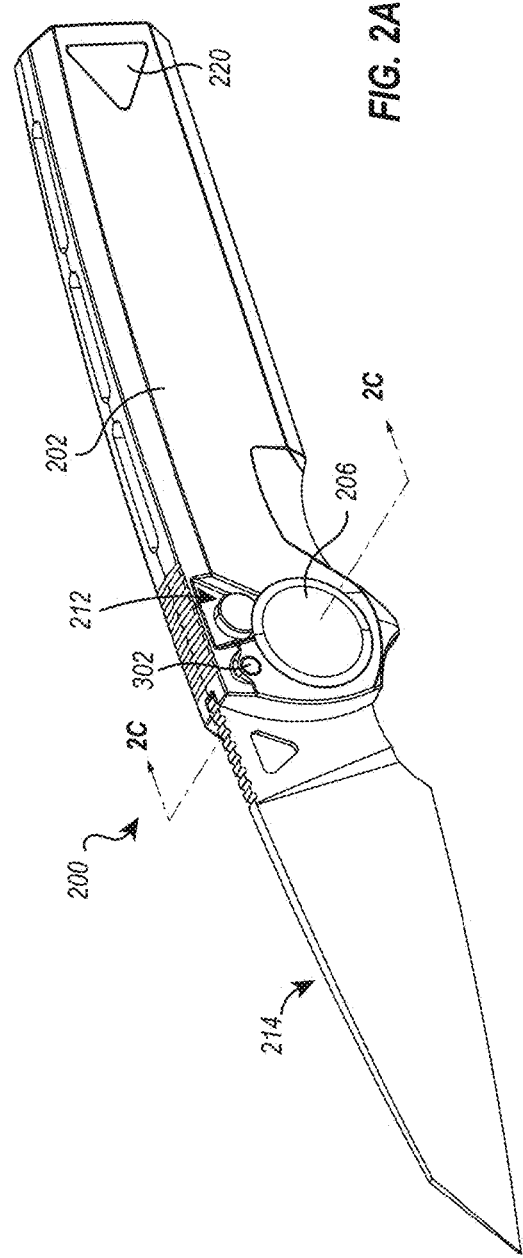
FIGS. 2A and 2B illustrate perspective views of a modular folding knife according to one example embodiment of the present disclosure.
Figure 2B:
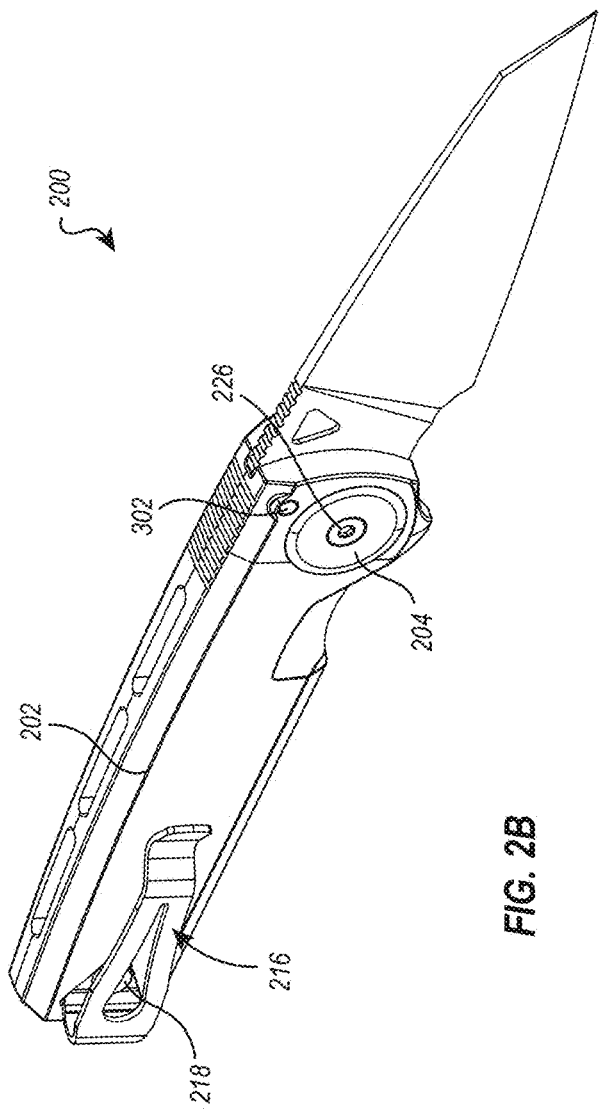
Figure 2C:
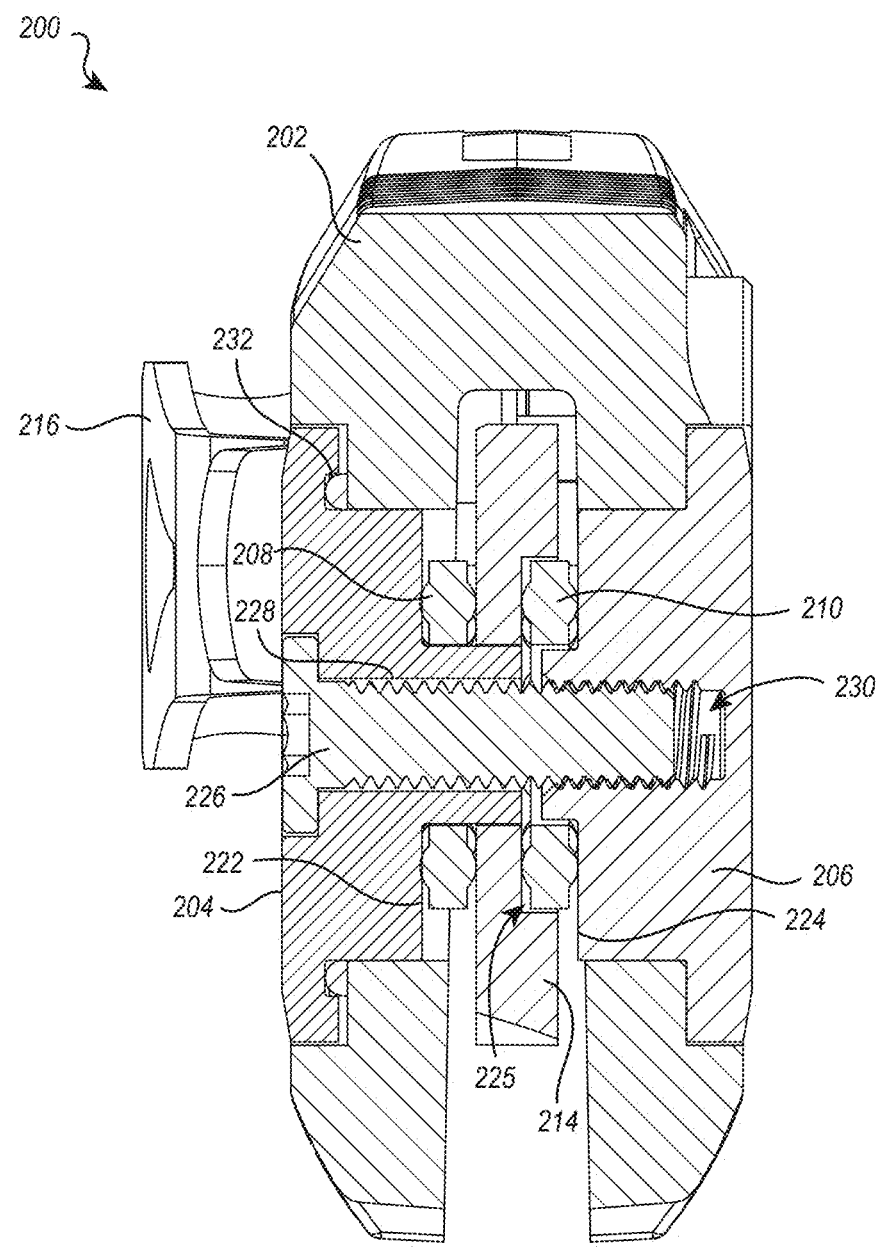
FIG. 2C illustrates a cross-section view of the modular folding knife of FIGS. 2A and 2B showing a manual function configuration.

Attention is now directed to FIGS. 2A-2C, which illustrate a knife 200 according to another embodiment of the present disclosure. FIGS. 2A and 2B illustrate perspective views of opposing sides of the knife 200 and FIG. 2C is a cross-sectional view thereof. The knife 200 may be similar or identical to the knife 100 in many respects. Accordingly, unless otherwise stated, the knife 200 may have features that are the same as or similar to those of the knife 100.

Generally, the knife 200 includes a handle 202, a bearing pivot 204, a bearing pivot 206, a ball bearing ring 208, a ball bearing ring 210, a lock mechanism 212, a blade 214, and a pocket clip 216.

The pocket clip 216 may be secured to the handle 202 with a fastener 218. The fastener 218 may extend through an aperture in the pocket clip 216 and into a bore in the handle 202. Users have different preferences regarding which side of the handle 202 they like to have the pocket clip 216 connected to. To enable the pocket clip 216 to be connected to either side of the handle 202, the bore may extend entirely through and open to both sides of the handle 202. A pocket clip retainer or cover 220 may be used to cover the opening to the bore on the side of the handle 202 to which the pocket clip 216 is not attached. In some embodiments, the cover 220 may include an attachment feature (e.g., a threaded recess) that can be engaged by the fastener 218. As a result, the fastener 218 can secure both the pocket clip 216 and the cover 220 to the handle 202.

As can be seen in FIG. 2C, the bearing pivots 204, 206 are slightly different from the bearing pivots 204, 206. One of the main differences is that the bearing pivots 204, 206 includes bearing surfaces 222, 224, respectively, that do not directly engage the opposing sides of the blade 214. Rather, the bearing surfaces 222, 224 are offset or spaced apart from the sides of the blade 214. The ball bearing rings 208, 210 are disposed between the bearing surfaces 222, 224 and the opposing sides of the blade 214.

One or both sides of the blade 214 may include a recess therein to receive the associated ball bear ring. In the illustrated embodiment, for instance, the blade includes a recess 225 is one side thereof. The ball bearing ring 210 can be positioned at least partially with in the recess 225 as shown.

The ball bearing rings 208, 210 may allow for easier movement between the blade 214 and the handle 202. For instance, with the illustrated configuration, the knife 200 may be opened by a user with one hand (e.g., with a flick of the wrist and/or with the aid of gravity). Thus, a knife with the illustrated pivot configuration (e.g., bearing pivots 204, 206, ball bearing rings 208, 210) may be considered a "gravity function" or "one-hand function" knife.

In the illustrated embodiment, the bearing pivots 204, 206 are connected together with a separate fastener 226. As shown, the fastener 226 may extend through an aperture 228 in the bearing pivot 204 and into a threaded bore 230 in the bearing pivot 206 to secure the bearing pivots 204, 206 together.

The knife 200 also includes a compliant member 232, such as an O-ring. In the illustrated embodiment, the compliant member 232 is positioned between the bearing pivot 204 and the handle 202. The compliant member 232 may compensate for tolerance differences between the handle 202, the bearing pivots 204, 206, the ball bearing rings 208, 210, and/or the blade 214. For instance, during the manufacturing process or later use, the precise dimensions of the noted components may not be formed or maintained precisely. As a result, when the knife 200 is assembled, there may be some lateral play between the parts. To take up or eliminate that play, the compliant member 232 may be included. Because the compliant member 232 is compliant and may be compressed, it can compensate for different levels of play between the components. Thus, the compliant member 232 may provide compensation for tolerances between the handle and blade, bearing rings, and/or bearing pivots, and thereby permit fine adjustments of the bearing pivot clearance and tension with the blade without affecting the handle fit/clearance (e.g., the space between the interior surface of the handle slot and the blade).

While the compliant member 232 is shown positioned between the bearing pivot 204 and the handle 202, this is only one example. In other embodiments, the compliant member 232 may be positioned between the bearing pivot 206 and the handle 202. In still other embodiments, the compliant member 232 may be positioned between adjacent surfaces of the bearing pivots 204, 206.

Figure 3A:
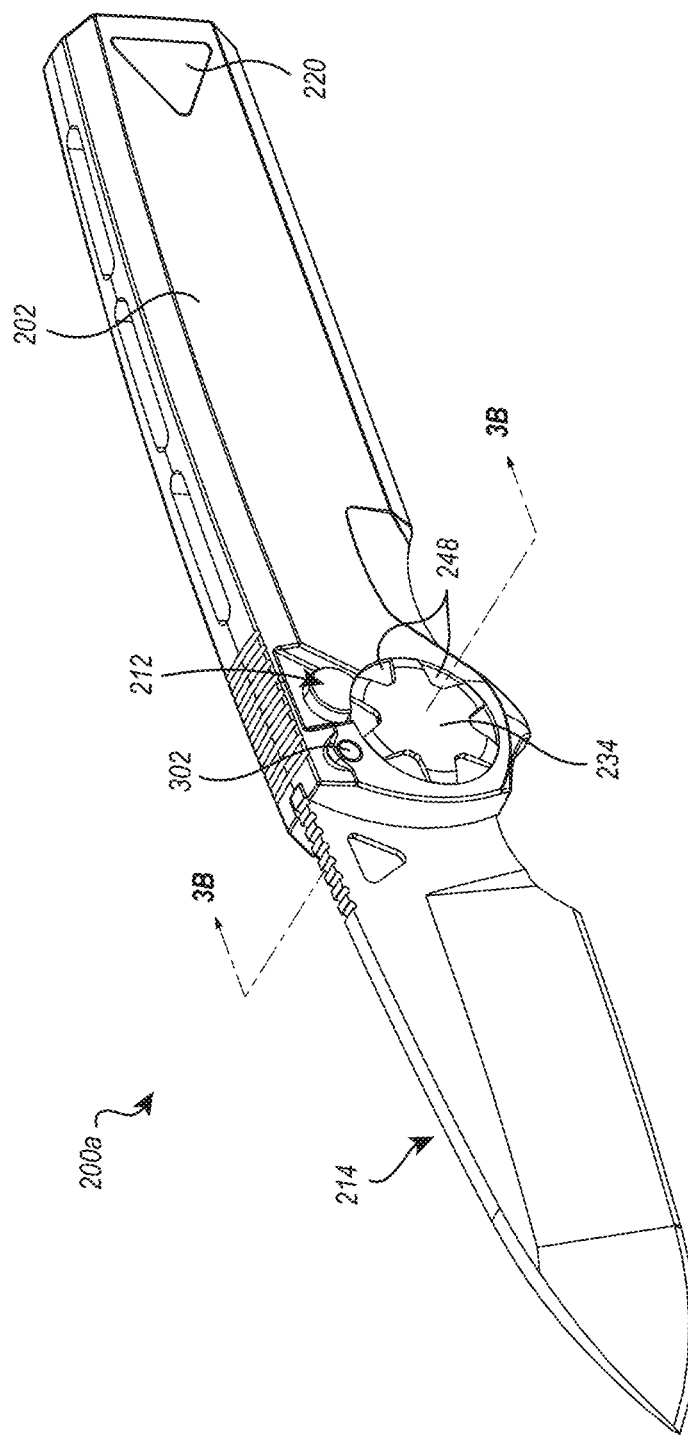
FIG. 3A illustrates a perspective view of the modular folding knife of FIGS. 2A and 2B with an automatic function configuration.
Figure 3B:
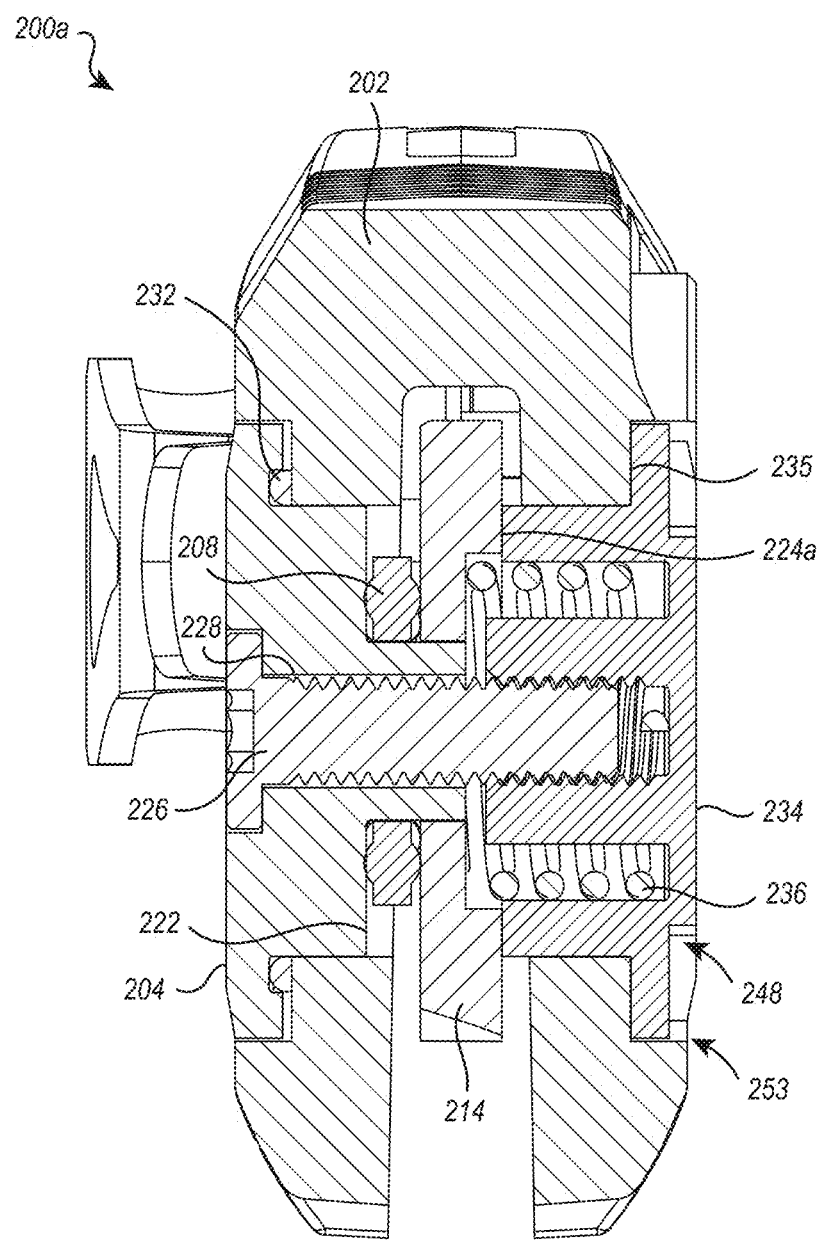
FIG. 3B illustrates a cross-section view of the modular folding knife of FIG. 3A.

Attention is now directed to FIGS. 3A and 3B, which illustrate a knife 200a. The knife 200a is the same as the knife 200 with some of the pivot or action/function components replaced with different pivot or action/function components. Specifically, as can be seen in a comparison between FIGS. 2A, 2C and FIGS. 3A, 3B, the bearing pivot 206 has been replaced with the bearing pivot 234. Additionally, the ball bearing ring 210 has been removed and a biasing member 236 (e.g., a tension spring) has been added. The bearing pivot 234 may be similar in many respects to the bearing pivot 206. For instance, the bearing pivot 234 includes a handle engagement surface 235 and a thrust bearing surface 224a that engages the blade 214.

As discussed in greater detail below, the biasing member 236 may be keyed to the blade 214 and the bearing pivot 234. The bearing pivot 234 may also be keyed to the handle 202. Due to the keying between the noted components, the biasing member 236 may be configured to bias or urge the blade 214 towards an open position relative to the handle 202. Thus, for instance, when the lock mechanism 212 is disengaged, the biasing member 236 will cause the blade 214 to pivot relative to the handle 202 to the open configuration shown in FIG. 3A. Thus, the knife 200a may be considered to have an "automatic function" configuration.

Figure 3C:
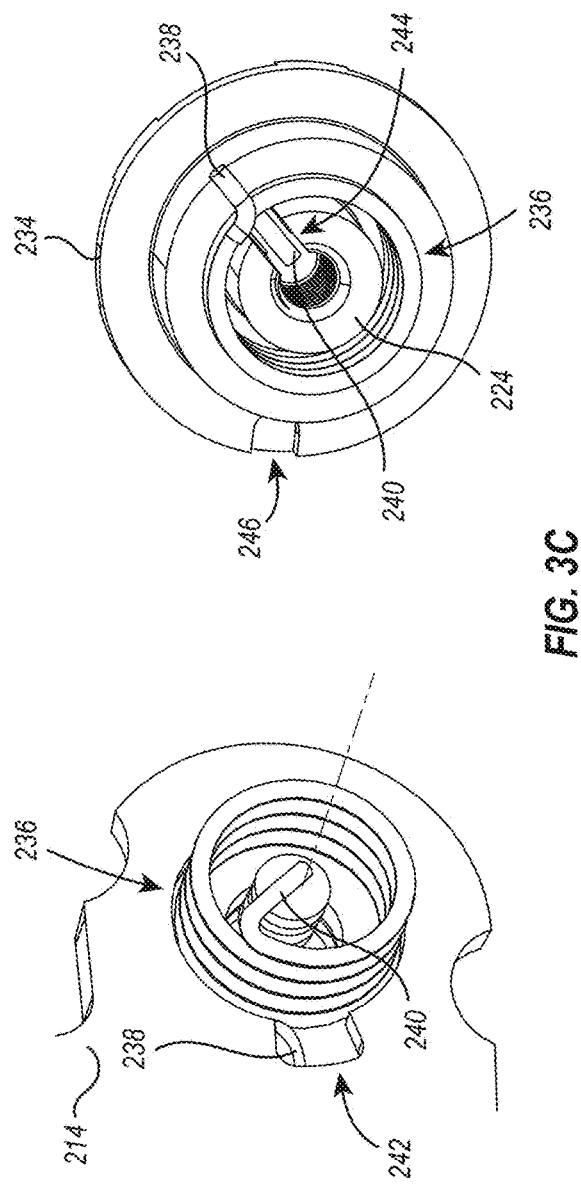
FIGS. 3C and 3D illustrate aspects of the automatic function configuration of FIGS. 3A and 3B.

FIG. 3C illustrates example manners for keying the biasing member 236 to the blade 214 and the bearing pivot 234 and for keying the bearing pivot 234 to the handle 202. In the illustrated embodiment, the biasing member 236 is a tension spring. The spring may have a first end or tail 238 and a second end or tail 240. The first tail 238 may be disposed within a retention feature 242 in the blade 214. The retention feature 242 may be a recess, slot, aperture, hook, or other feature in the blade 214 configured to selectively receive and retain the first tail 238, such that the movement of the blade 214 and the first tail 238 are linked together.

Similarly, the second tail 240 may be disposed within a retention feature 242-244 (e.g., a recess, slot, aperture, hook, or other feature) in the bearing pivot 234 to limit or prevent relative movement therebetween. Likewise, the bearing pivot 234 includes a key feature 246 (e.g., recess, notch, keyway, etc.) that may be keyed to a corresponding key feature (e.g., key, projection, etc.) in the handle 202 to limit or prevent relative movement therebetween. Similar key features may be included on any of the bearing pivots disclosed herein.

Although FIG. 3C illustrates the blade 214 with a single retention feature 242 and the bearing pivot 234 with a single key feature 246, this in merely an example. In other embodiments, the blade 214 and/or the bearing pivot 234 may include multiple retention features 242, 244 and/or key features 246. Including multiple retention features 242, 244 and/or key features 246 may allow of the biasing force of the biasing member 236 to be selectively adjusted. For instance, the first and second tails 238, 240 may be inserted within different combinations of the retention features 242, 244 and/or key features 246. To achieve this, the biasing member 236 may have to coiled to different levels, thereby adjusting the biasing force produced by the biasing member 236. Similarly, the handle may include multiple key features. Rotating the bearing pivot 234 to align the key feature 246 with a particular key feature on the handle may adjust the tension in the biasing member 236.

Figure 3D:
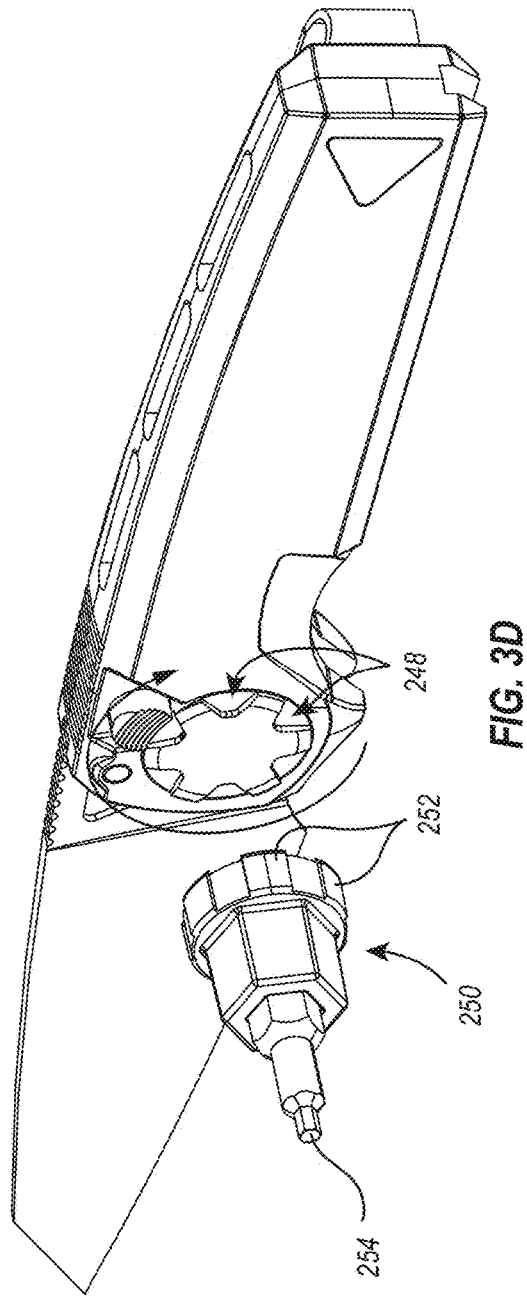

As shown in FIGS. 3A, 3B, and 3D, the bearing pivot 234 may include one or more drive features 248. The drive features 248 may be configured to be engaged by a tool 250 with corresponding drive features 252. The tool 250 may be used to insert and rotate the bearing pivot 234 in the second bearing aperture 253. The bearing pivot 234 may be rotated to adjust the load on the biasing member 236 (e.g., loosen or tighten the coil) and/or to align the key feature 246 with a corresponding key feature on the handle 202.

Once the bearing pivot 234 is installed, the tool 250 may be used to secure the fastener 226. For instance, the tool 250 may include a second drive feature 254 that is configured to engage and rotate the fastener 226 into engagement with the bearing pivot 234.

In addition to providing the biasing force to urge the blade 214 towards the open position, the biasing member 236 may also provide a compressive force between the blade 214 and the bearing pivot 234. This compressive force may urge the blade 214 laterally against the ball bearing ring 208 (or a thrust bearing surface on an opposing bearing pivot) to secure the blade 214 laterally within the handle 202.

Figure 4A:
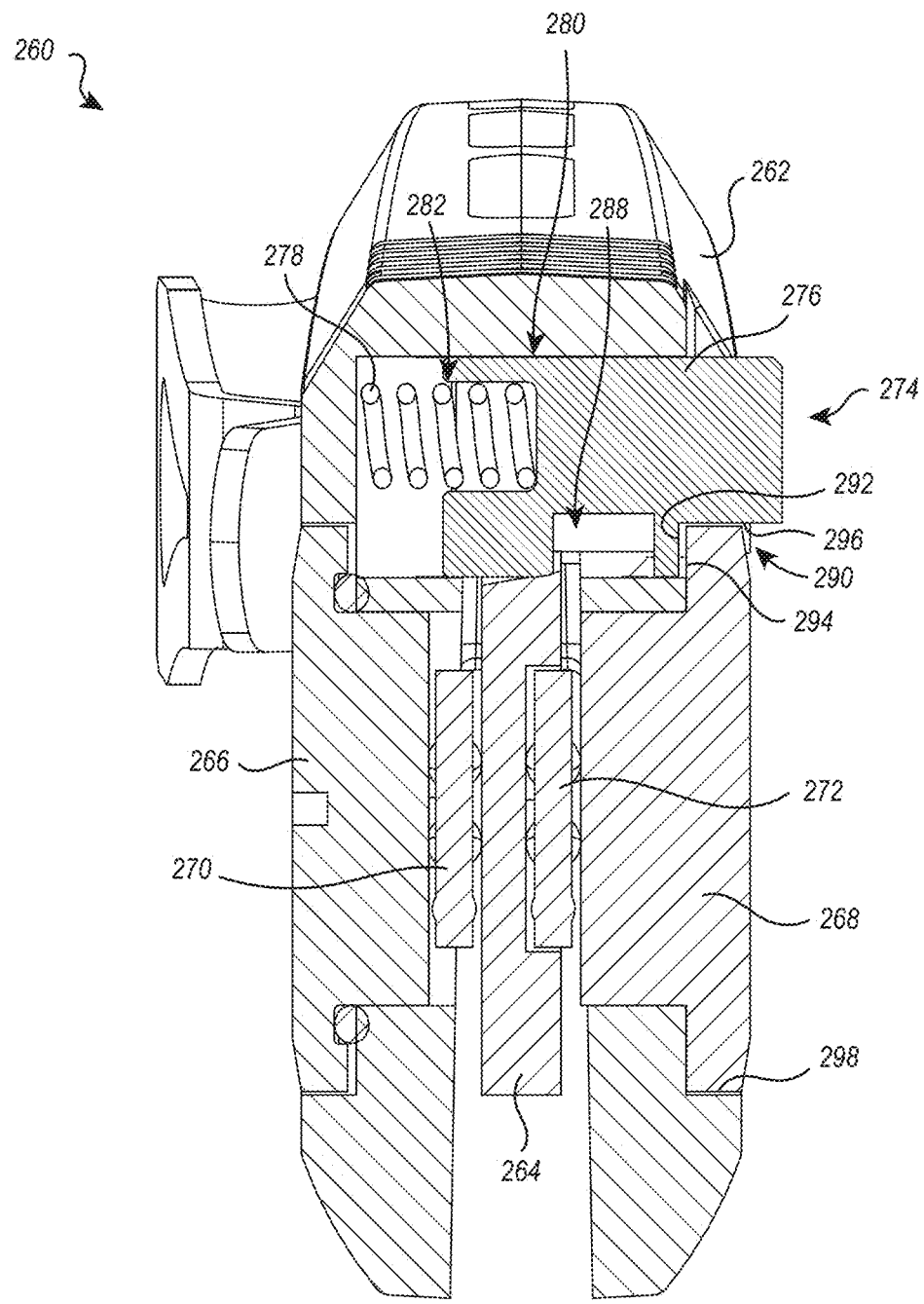
FIGS. 4A and 4B illustrate a lock mechanism for a folding knife according to one example embodiment of the present disclosure.
Figure 4B:
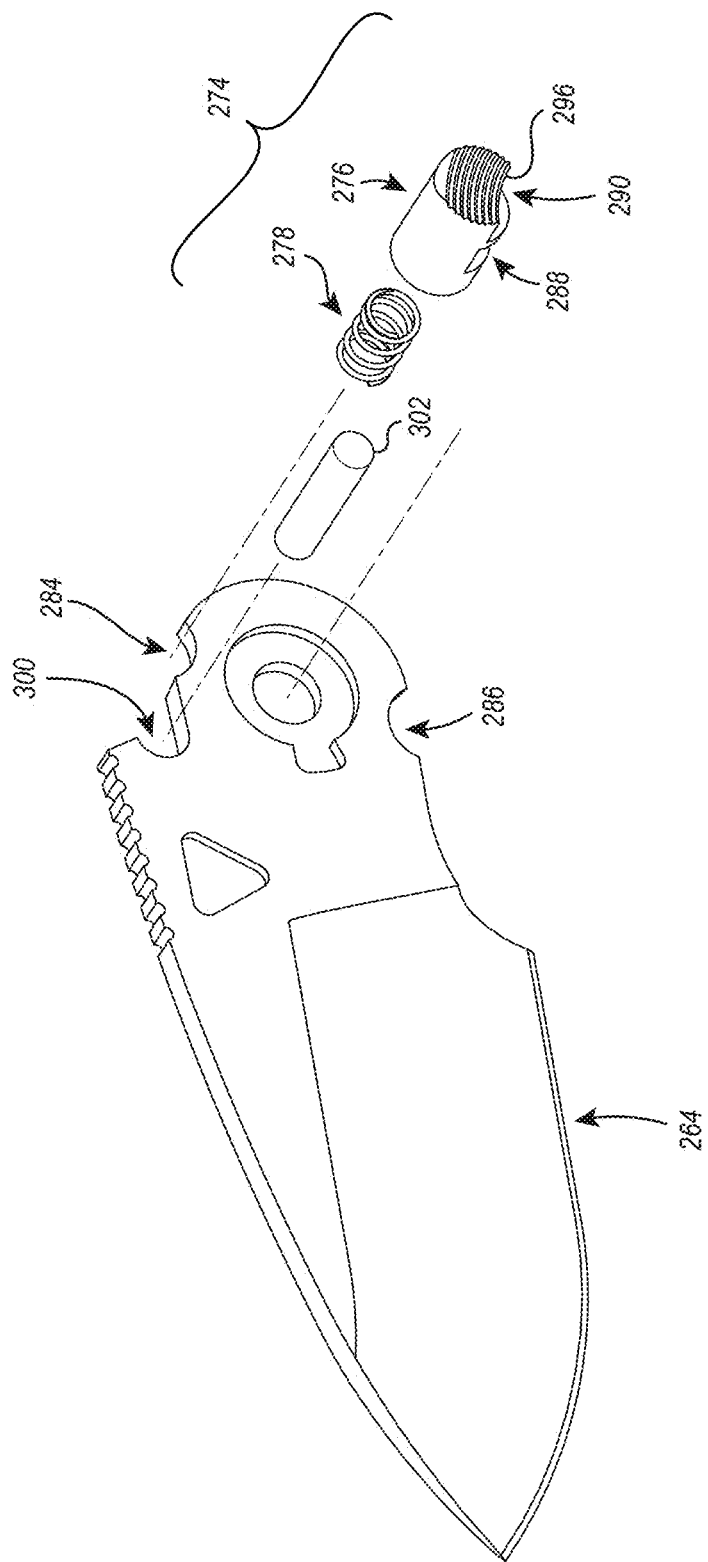

Attention is now directed to FIGS. 4A and 4B, which illustrate an example lock mechanism that may be used with any of the knives disclosed herein. FIG. 4A illustrates a cross-sectional view of a knife 260. The knife 260 includes a handle 262, a blade 264, a first bearing pivot 266, a second bearing pivot 268, a first ball bearing ring 270, a second ball bearing ring 272, and a lock mechanism 274.

The lock mechanism 274 includes a lock pin 276 and a biasing member 278. The lock pin 276 and biasing member 278 are configured to be received within a lock channel 280 in the handle 262. In the illustrated embodiment, the lock pin 276 includes a recess 282 in an end thereof that is configured to receive the biasing member 278 partially therein. The biasing member 278 is configured to extend out of the recess 282 and engage a surface within the handle 262 to bias the lock pin 276 to a locked position (e.g., away from the surface and partially out of the handle 262).

In the illustrated embodiment, the lock pin 276 has a generally cylindrical form. However, other shapes are contemplated. When the lock pin 276 is in a locked position (e.g., not depressed, biasing member 278 extended, etc.), as shown in FIG. 4A, a portion of the outer surface of the lock pin 276 may mate with or otherwise engage one of two lock detents 284, 286 in the blade 264. When the lock pin 276 engages either of the lock detents 284, 286, the engagement prevents the blade 264 from rotating relative to the handle 262. The lock pin 276 can engage the lock detent 284 when the blade 264 is in an open configuration to maintain the blade 264 in the open configuration. Similarly, the lock pin 276 can engage the lock detent 286 when the blade 264 is in the closed configuration to maintain the blade 264 in the closed configuration.

To enable movement of the blade 264 relative to the handle 262 between the open and closed positions, the lock pin 276 can be pressed further into the handle 262. Pressing the lock pin 276 further into the handle 262 can overcome the biasing force of the biasing member 278. Additionally, pressing the lock pin 276 further into the handle 262 disengages the outer surface of the lock pin 276 from the detents 284, 286 and allows a notch 288 in the outer surface of the lock pin 276 to be aligned with the blade 264. Alignment of the notch 288 and the blade 264 provides enough clearance between the lock pin 276 and the blade 264 to allow for the blade 264 to rotate relative to the handle 262. Once the blade 264 has been rotated to the desired position (e.g., opened or closed), the outer surface of the lock pin 276 may be aligned with one of the lock detents 284, 286 and the biasing member 278 may urge the lock pin 276 back to the locked position, thereby engaging the outer surface of the lock pin 276 with one of the lock detents 284, 286.

The lock pin 276 also includes a retention notch 290. The retention notch 290 may include a shoulder 292. The shoulder 292 may engage a surface 294 on the bearing pivot 268. The engagement between the shoulder 292 and the bearing pivot 268 may hold the lock pin 276 within the lock channel 280. The lock pin 276 and the biasing member 278 may be removed from the handle 262 by removing the bearing pivot 268 and then withdrawing the lock pin 276 and the biasing member out of the lock channel 280. Thus, the lock mechanism 274 may be installed and removed from the outside of the handle 262.

The retention notch 290 may also include a surface 296 that engages with an outer surface 298 of the bearing pivot 268. The surfaces 296, 298 may have mating or complimentary contours that are configured to prevent the lock pin 276 from rotating about its axis. If the lock pin 276 were allowed to rotate about its axis, the notch 288 may no longer face the blade 264. As a result, the blade 264 may not have sufficient clearance to rotate even when the lock pin 276 is pressed.

As illustrated in the current embodiment, the recess 282, the notch 288, and the retention notch 290 may be offset from one another along the longitudinal axis of the lock pin 276. In such a configuration, a relatively small or short coil spring can be used as the biasing member 278.

FIG. 4B also shows that the blade 264 includes a stop detent 300 formed therein. The stop detent 300 is configured to engage a stop pin 302 (also shown in FIGS. 2A, 2B, 3A) when the blade 264 is moved to the open configuration. This engagement can prevent the blade 264 from over-rotating relative to the handle when being moved to the open configuration. In some embodiments, stop pin 302 may be positioned within corresponding recess(es) in the handle or corresponding recesses in each bearing pivot. In other embodiments, stop pin 302 may be a surface or surfaces formed into the handle or one or both bearing pivots.

Figure 5:
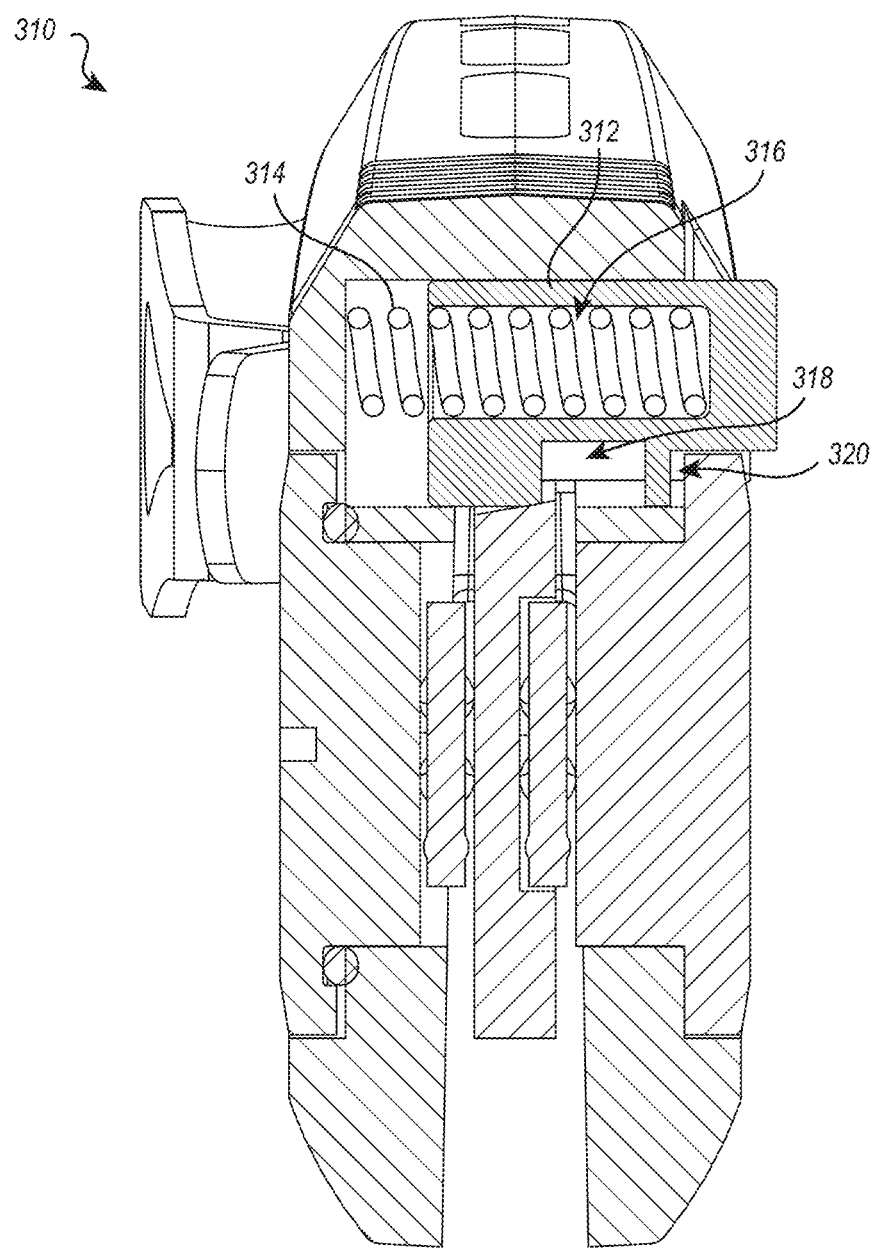
FIG. 5 illustrates a lock mechanism for a folding knife according to another example embodiment of the present disclosure.

Attention is now directed to FIG. 5, which illustrates another example embodiment of a lock mechanism 310 that may be used with the knives disclosed herein. Similar to the lock mechanism 274, the lock mechanism 310 includes a lock pin 312 and a biasing member 314. Also like the lock mechanism 274, the lock pin 312 includes a recess 316 for receiving a portion of the biasing member 314 therein, a notch 318, and a retention notch 320.

In contrast to the lock mechanism 274, the recess 316 and the biasing member 314 are significantly longer. For instance, in the illustrated embodiment, the recess 316 extends through a substantial portion of the length of the lock pin 312. The biasing member 314 is also correspondingly longer. Additionally, the recess 316 overlaps the notch 318 and a portion of the retention notch 320 along the longitudinal axis of the lock pin 312. In other embodiments, the recess 316 may overlap the notch 318 but not the retention notch 320. In still other embodiments, the recess 316 may overlap a portion of the notch 318. Such configurations allow for larger and/or longer biasing members to be used, thereby allowing for stronger biasing and locking forces to be achieved.

In some embodiments, a set screw may be provided within the recess 316 to provide adjustment to the effective length of recess 316. Adjusting the length of recess 316 may provide more or less compression of biasing member 314 and results in a corresponding increase or decrease in bias force exerted between the lock pin 312 and blade 264.

The lock mechanisms illustrated in FIGS. 4A-5 may be considered "hard lock mechanisms." A hard lock mechanism may be one that requires user engagement with the lock mechanism (e.g., depressing a lock pin, pivoting a lever, etc.) to disengage the lock and allow for pivoting of the blade relative to the handle. In some embodiments, a hard lock mechanism may be undesirable. In some embodiments, the engaging surfaces of lock detents 284 and/or 286 of blade 264 are parallel or at a small angle relative to the corresponding engaging surface of lock pin 276 or 312. This angle may be between 0-20 degrees. The lock detents may be formed at or nearly full thickness of blade 264. These embodiments would be considered a hard lock requiring user engagement of the lock pin 276 or 312 to disengage the lock.

In other embodiments, a "soft lock" may be desired. In these cases, a desired force applied to the blade would overcome the force of the bias member 278 or 314, permitting the lock pin 276 or 312 to retract from the lock detents 284 or 286 and disengage the blade lock without user engagement of the lock pin 276 or 312. In these embodiments, the engaging surfaces of the lock detents 284 and/or 286 of the blade 264 may be formed at larger angles relative to the corresponding engaging surface of the lock pin 276 or 312. This angle may be between 20-45 degrees. The lock detents may further only be formed at a partial thickness of the blade. In these embodiments, the shallow depth of engagement and larger angle between the engaging surfaces provide a soft lock. A desired force applied to the blade will exert a component of force parallel to the lock pin axis that exceeds the force of the bias member 278 or 314.

Figure 6:
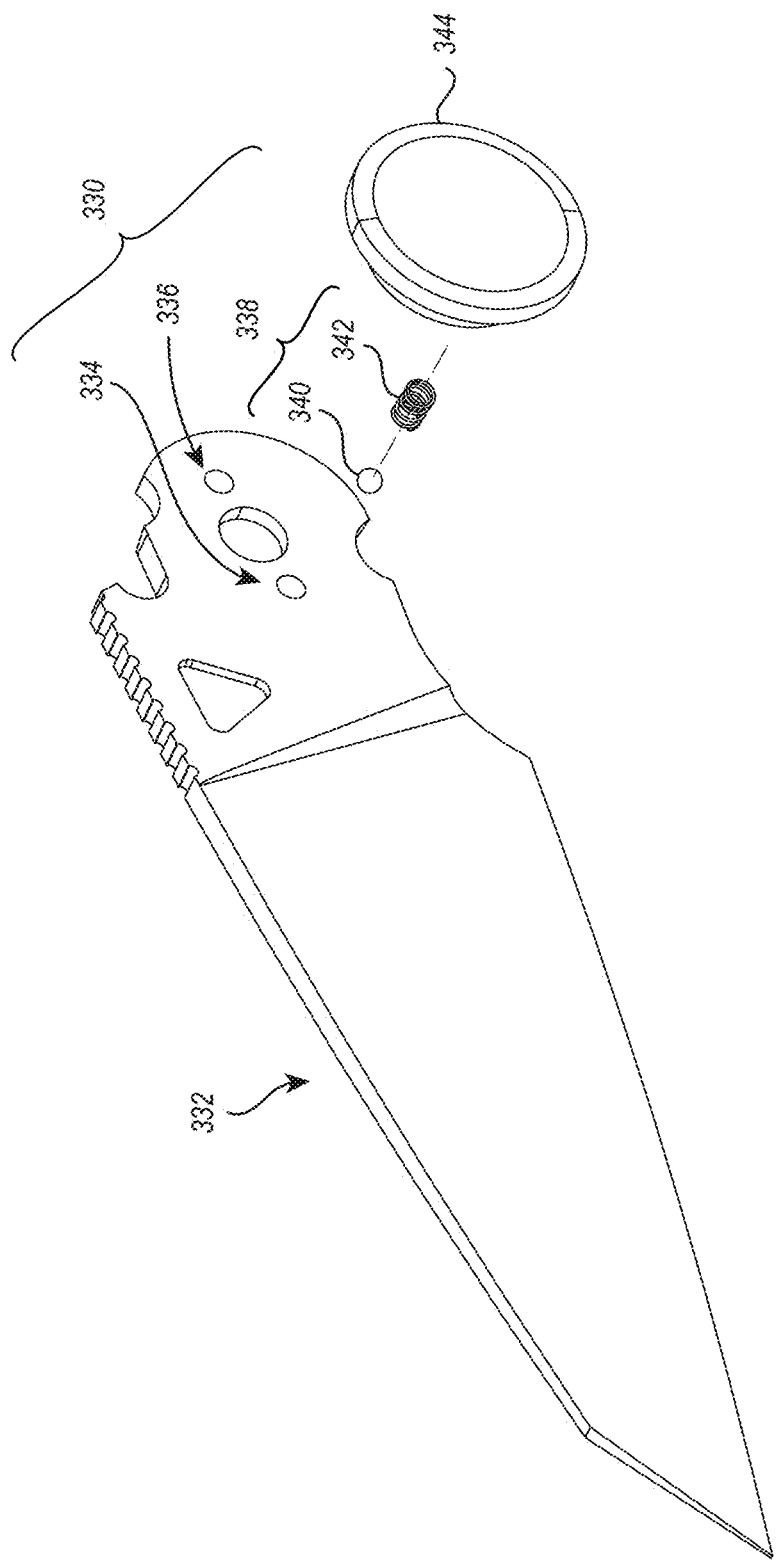
FIG. 6 illustrates a blade retention feature or soft lock mechanism for a folding knife according to one example embodiment of the present disclosure.

FIG. 6 illustrates another example embodiment of a lock mechanism 330 (also referred to as a blade retention feature) that may be employed to hold the blade 332 in an open or closed configuration. The lock mechanism 330 may be considered a "soft lock mechanism" because it allows the blade to be pivoted relative to a handle without requiring a user to engage a component of the lock mechanism 330 to disengage the lock mechanism 330.

In the illustrated embodiment, the lock mechanism 330 includes detents 334, 336 formed in a side of the blade 332. The lock mechanism 330 may also include an engagement feature 338 that can engage the detents 334, 336 depending on the position of the blade 332. For instance, the engagement feature 338 may engage the detent 334 when the blade 332 is in an open position and the engagement feature 338 may engage the detent 336 when the blade 332 is in a closed position. The engagement between the engagement feature 338 and the detents 334, 336 may hold the blade 332 in the open or close position unless a force above a predetermined threshold is applied to the blade 332 to pivot the blade 332 to the other position.

In the illustrated embodiment, the engagement feature 338 comprises a ball 340 and spring 342. All or a portion of the spring 342 and optionally a portion of the ball 340 may be received within a recess within a bearing pivot 344. In many respects, the bearing pivot 344 may be similar or identical to the other bearing pivots disclosed herein and the other bearing pivots disclosed herein may include a recess for receiving an engagement feature, such as the engagement feature 338.

In use, the blade 332 may be in a closed position relative to a handle. The engagement feature 338 may engage the detent 336 to hold the blade 332 in the closed position. When a user wants to deploy the blade 332, the user may pull on the blade 332 to pivot the blade 332 relative to the handle. Pulling on the blade 332 with a force above a predetermined level may overcome the spring force of the spring 342. As a result, the spring 342 will compress and draw the ball 340 out of the detent 336 and allow the blade 332 to move relative to the handle. When the blade 332 has been rotated to the open position, the engagement feature 338 may be aligned with the detent 334 and the spring 342 may push the ball 340 into engagement with the detent 334 to secure the blade 332 in the open position.

A knife according to the present disclosure may be made with a variety of different handle constructions. In the previous embodiments, the handles were illustrated has having single piece constructions. In such cases, the handles may be cast as a single component or machined from a single workpiece. Such handles may be formed of metal, plastic, wood, or composite materials. In other embodiments, knife handles may be formed from multiple components, as shown in FIGS. 7A-8.

Figure 7A:
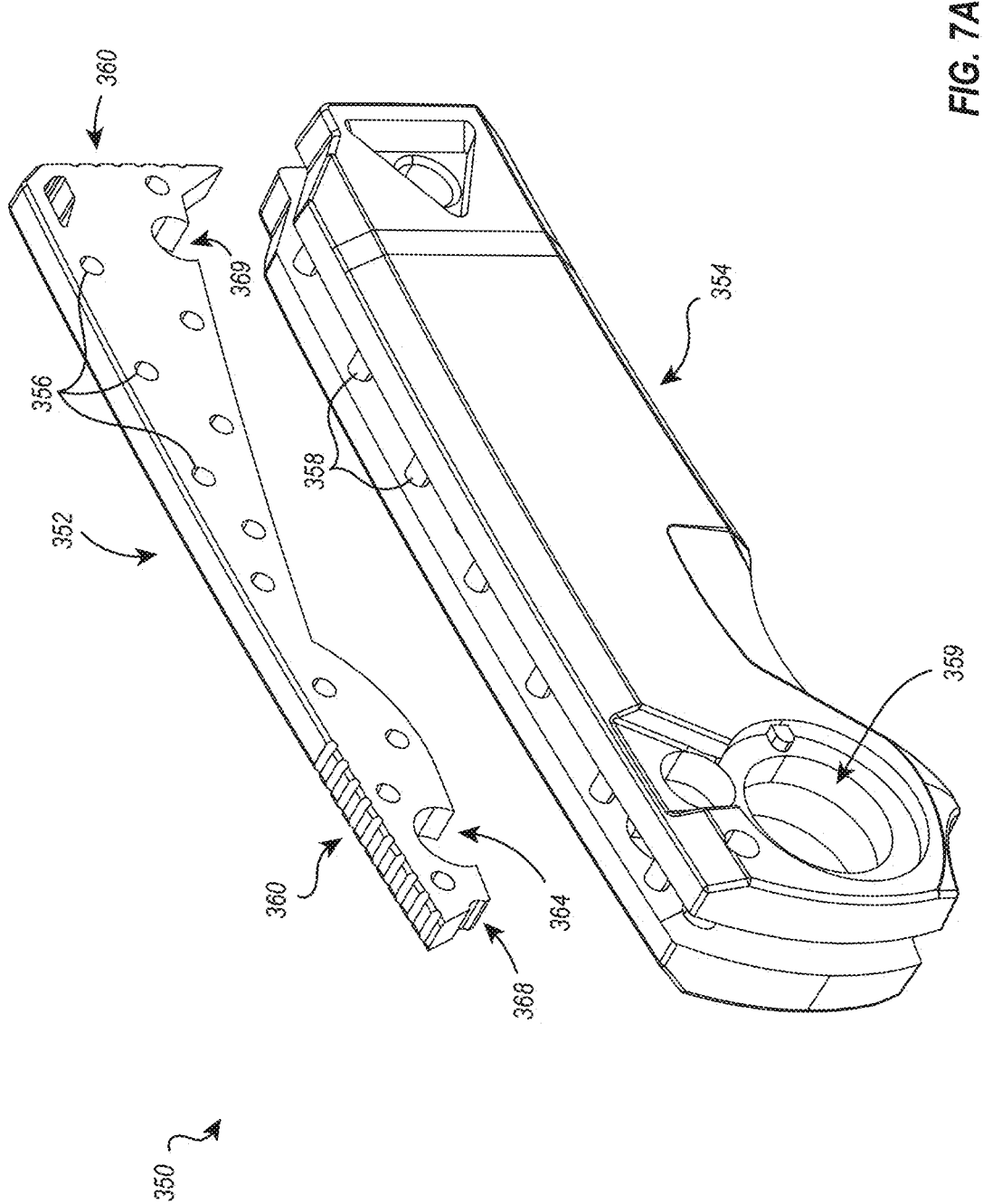
FIGS. 7A and 7B illustrate a handle for a folding knife according to one example embodiment of the present disclosure.
Figure 7B:
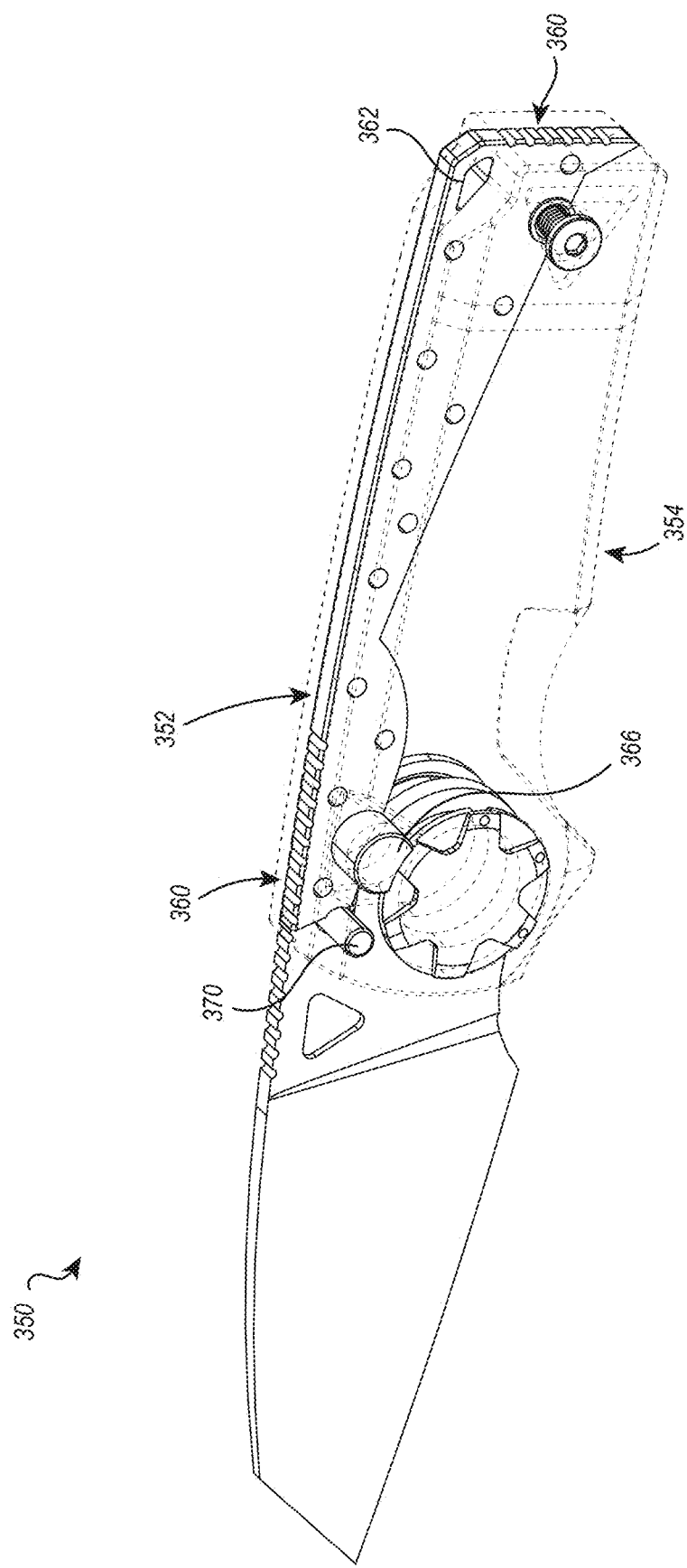
Figure 8:
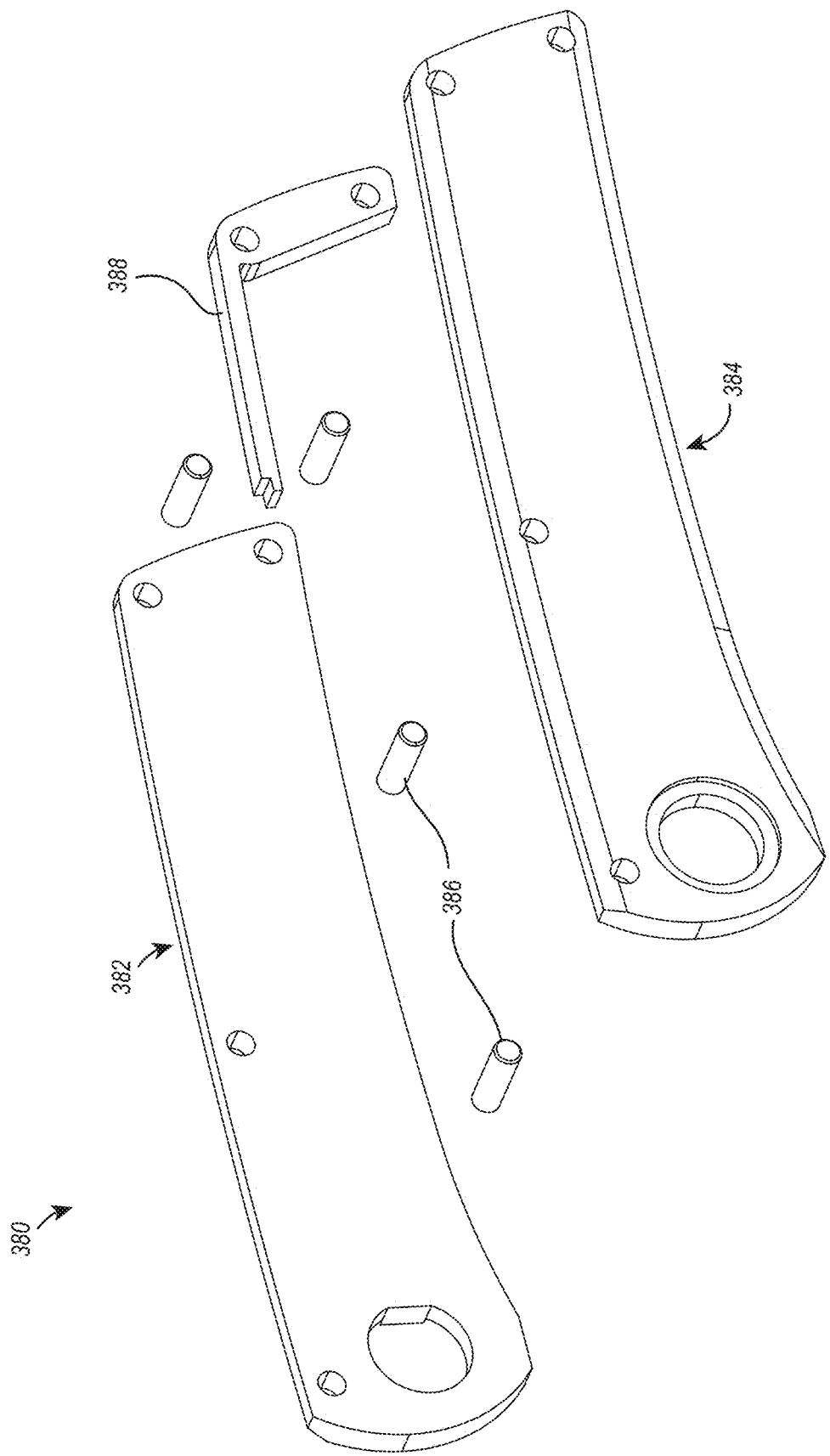
FIG. 8 illustrates another handle for a folding knife according to one example embodiment of the present disclosure.

The embodiment of FIGS. 7A and 7B illustrate a handle 350 that includes a spine 352 a molded component 354. The spine 352 may be formed of metal or other strong and rigid material to provide the handle 350 with structural integrity. The molded component 354 may be formed of a plastic, resin, or other material that can be injection or cast molded. The spine 352 may include one or more apertures 356 extending therethrough. When the handle 350 is formed, the molded component 354 may be cast or injected at least partially around the spine 352. Some of the material that forms the molded component 354 may flow through the apertures 356, thereby forming bridges 358. As the molded component 354 cures, the bridges 358 may secure the molded component 354 to the spine 352.

As can be seen, the molded component 354 may form significant portions of the outer surfaces of the handle 350. In the illustrated embodiment, the molded component 354 includes the bearing apertures in opposing sides thereof. A bearing aperture 359 is shown in FIG. 7A. The bearing apertures may be similar or identical to the other bearing apertures disclosed herein.

In some embodiments, portions of the spine 352 may be exposed and form portions of the outer surfaces of the handle 350. In the illustrated embodiment, the spine 352 is exposed and visible along the top and end of the handle 350. This can provide desirable aesthetics to the handle 350. It can also serve functional purposes. For instance, the spine 352 may include areas of jimping 360. It may also allow for the exposed portion of the spine 352 to be used to hit an object without damaging the molded component 354. Still further, the exposed portion of the spine 352 may include a lanyard aperture 362 configured to have a lanyard connected thereto, a bottle opener, or other functional feature.

The spine 352 may also include features that are configured to support higher load components of a knife. For instance, the spine 352 may include a saddle 364 that is configured to engage and support a lock pin 366. Similarly, the spine 352 may include a saddle 368 that is configured to engage and support a stop pin 370. Likewise, the spine 352 may include a saddle 369 that is configured to engage a fastener used to secure a pocket clip to the handle 350. The saddles 364, 368, 369 may be contoured edges or surfaces or may be recesses or apertures in the spine 352.

FIG. 8 illustrates an exploded view of another example embodiment of a knife handle 380. In the illustrated embodiment, the handle 380 includes opposing scales 382, 384. Each of the scales 382, 384 may be formed of one or more layers, including liners. The scales 382, 384 may be connected together with one or more fasteners 386. Additionally, in some embodiments, a spacer 388 may be included between portions of the scales 382, 384.

Attention is now directed to FIGS. 9A-9E, which illustrate example alignment and sharpening features and components. The alignment and sharpening features and components may be incorporated into or used with any of the knives disclosed herein or other knifes.

Figure 9A:
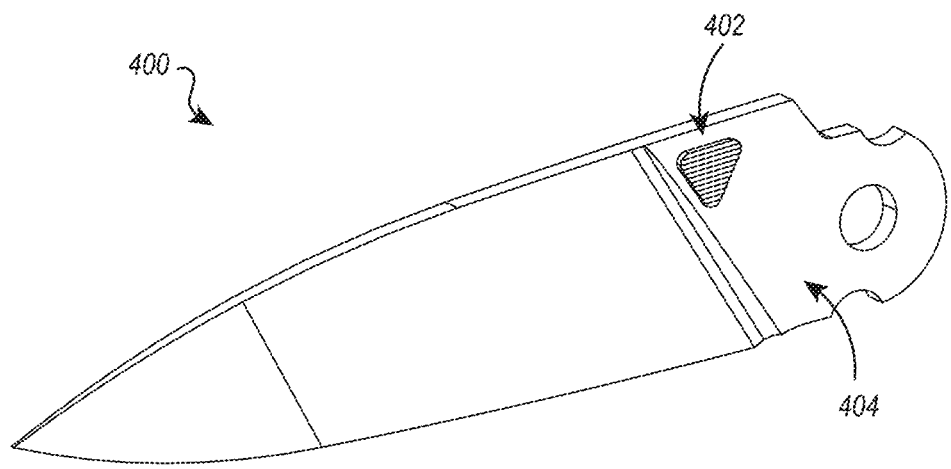

FIG. 9A illustrates a blade 400. The blade 400 may be similar or identical in many respects to the other blades disclosed herein. As shown, the blade 400 includes a locating or alignment feature 402 on a surface thereon. Although not illustrated, the blade 400 may include a corresponding alignment feature on an opposing side thereof.

The alignment feature 402 may be positioned on the blade 400 in a predetermined location on the blade 400. The predetermined location may be relative to a position along a cutting edge, a distance to the cutting edge, and/or symmetry to a center plane of the blade. In the present embodiment, the alignment feature 402 is illustrated as being on a tang 404 of the blade 400, but this is only on example. In the illustrated embodiment, the alignment feature 402 in in the form of a triangular projection. Other shapes are also contemplated herein.

Figure 9B:
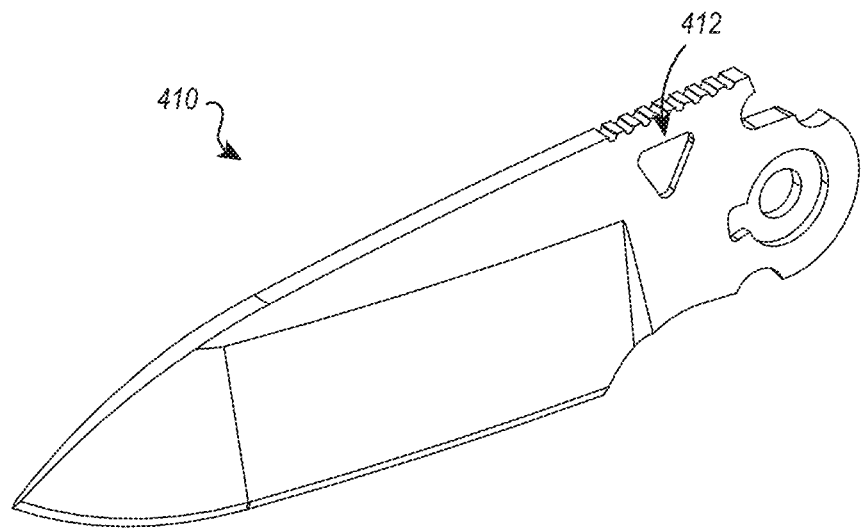

FIG. 9B illustrates a blade 410 with a locating or alignment feature 412. The blade 410 is similar to the blade 400. However, the alignment feature 412 takes the form of a recess in the blade 410 rather than as a projection.

FIG. 9C illustrates a sharpening guide 420 that may be used with a blade having an alignment feature 412. The sharpening guide 420 may have one or more locating or alignment features that correspond to locating or alignment features on a blade. The sharpening guide 420 may include at least one guide surface positioned to provide the desired edge angle when both the guide surface and cutting edge are placed into contact with the sharpening surface.

The sharpening guide 420 includes a first half 422 and a second half 424 that are connected together by a hinge 426. A biasing member 428 may be disposed between interior surfaces of the first and second halves 422, 424 and to a first side of the hinge 426. The biasing member 428 may urge the first and second halves 422, 424 apart on the first side of the hinge 426. This results in the portions of the first and second halves 422, 424 on a second side of the hinge 426 being urged closer together.

One or both of the interior surfaces of the first and second halves 422, 424 may have an alignment feature 430. The alignment feature(s) 430 may have a similar or identical shape to the alignment feature(s) 412 on a blade. However, the alignment feature(s) 430 may have profiles that are complimentary to the profiles of the alignment feature(s) 412. For instance, the alignment feature(s) 430 may be projections rather than recesses like the alignment feature(s) 412. Accordingly, the alignment feature(s) 430 may extend into the alignment feature(s) 412 when the sharpening guide 420 is mounted on the blade.

To mount the sharpening guide 420 on a blade, the portions of the first and second halves 422, 424 on the first side of the hinge 426 are compressed together. As the portions of the first and second halves 422, 424 on the first side of the hinge 426 are compressed together, the portions of the first and second halves 422, 424 are spread apart from one another due to the arrangement of the hinge 426. With the portions of the first and second halves 422, 424 on the second side of the hinge 426 spread apart, the blade 410 can be inserted therebetween. The alignment features 412, 430 can be aligned with each other. The compression force on the portions of the first and second halves 422, 424 on the first side of the hinge 426 can be removed to allow for the alignment features 412, 430 to mate with one another.

The mating of the alignment features 412, 430 can position and orient the guide surfaces 432, 434 on the sharpening guide 420 relative to a cutting edge CE of the blade 410. The guide surfaces 432, 434 may be formed on the outside surfaces of the first and second halves 422, 424, respectively. The guide surfaces 432, 434 may be oriented to match or be parallel to the (desired) bevels on the cutting edge CE of the blade 410.

Figure 9E:
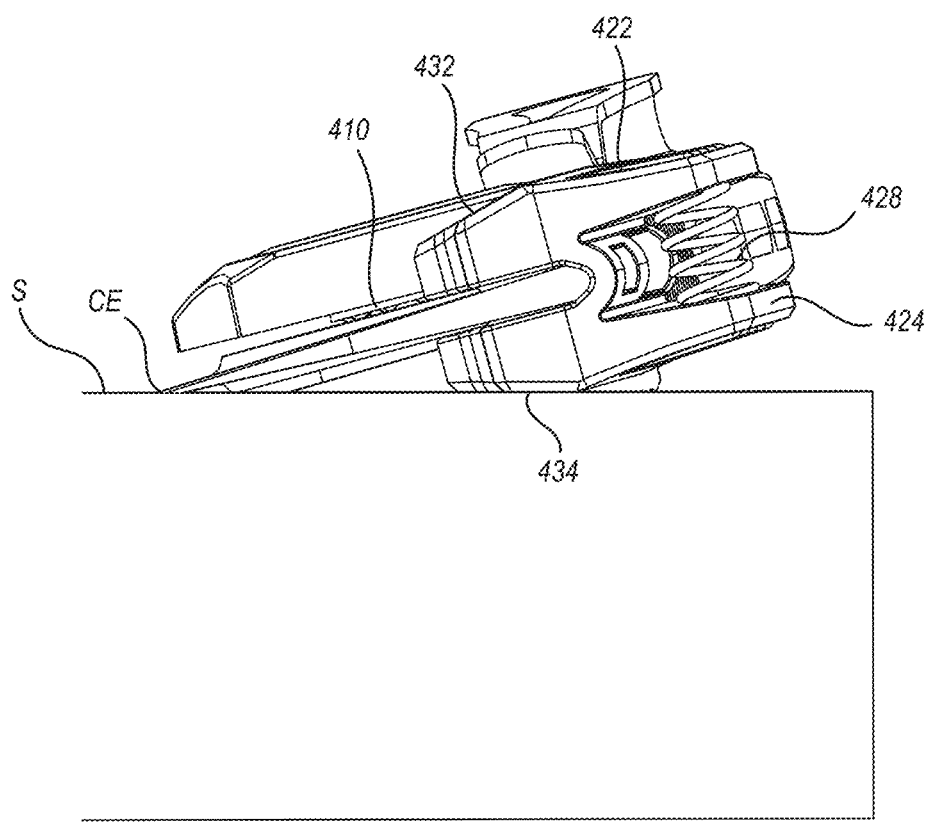

To perform a sharpening procedure on blade 410, the sharpening guide 420 is mounted on the blade 410 as described and shown in FIG. 9D. Thereafter, the sharpening guide 420 can be positioned on a sharpening stone S with one of the guide surfaces 432, 434 positioned flat on the stone S, as shown in FIG. 9E. Due to the relative positioning and orientation between the sharpening guide 420 and the blade 410 (as a result of the engagement of the alignment features 412, 430), positioning one of the guide surfaces 432, 434 flat on the stone S will also position one of the bevels of the cutting edge CE against the stone S. The sharpening guide 420 and the blade 410 can then be moved across the stone S to sharpen the cutting edge CE. Once one side of the blade 410 has been sharpened, the sharpening guide 420 and the blade 410 can be flipped over and the blade 410 can be sharpened on the other side (e.g., by moving the cutting edge CE across the stone S using the other guide surface 432, 434 as a reference against the stone S).

Following are some further example embodiments of the invention. These are presented only by way of example and are not intended to limit the scope of the invention in any way. Further, any example embodiment can be combined with one or more of the example embodiments.

Embodiment 1: A folding knife kit, comprising: a handle having first and second bearing apertures that open to an exterior of the handle; a blade disposable at least partially within the handle and between the first and second bearing apertures; a first bearing pivot insertable within and removable from the first bearing aperture from the exterior of the handle, the first bearing pivot comprising a thrust bearing surface; a second bearing pivot insertable within and removable from the second bearing aperture from the exterior of the handle, the second bearing pivot comprising a thrust bearing surface; and a third bearing pivot and biasing member insertable within and removable from the second bearing aperture from the exterior of the handle in place of the second bearing pivot, the third bearing pivot comprising a thrust bearing surface, and the biasing member being keyable to the blade and the third bearing pivot to bias the blade to an open position.

Embodiment 2: The folding knife kit of Embodiment 1, wherein the first bearing pivot and/or at least one of the third or fourth bearing pivots comprises a radial bearing surface about which the blade is configured to rotate.

Embodiment 3: The folding knife kit of Embodiment 1, wherein the first bearing pivot is selectively and alternately connectable to the second bearing pivot and the third bearing pivot.

Embodiment 4: The folding knife kit of Embodiment 3, wherein the first bearing pivot comprises a first connection feature and each of the second and third bearing pivots comprise a corresponding second connection feature that is configured for selective connection to the first connection feature.

Embodiment 5: The folding knife kit of Embodiment 3, wherein the first bearing pivot is selectively and alternately connectable to the second bearing pivot and the third bearing pivot with a fastener.

Embodiment 6: The folding knife kit of Embodiment 1, wherein the thrust bearing surface of the first bearing pivot is configured to directly engage a surface of the blade.

Embodiment 7: The folding knife kit of Embodiment 1, further comprising a bearing ring disposable between the thrust bearing surface of the first bearing pivot a side of the blade.

Embodiment 8: The folding knife kit of Embodiment 1, wherein the thrust bearing surface of the second bearing pivot is configured to directly engage a surface of the blade.

Embodiment 9: The folding knife kit of Embodiment 1, wherein: a bearing ring is configured to be disposed between the thrust bearing surface of the first bearing pivot; and the thrust bearing surface of the third bearing pivot is configured to engage directly with a side of the blade.

Embodiment 10: The folding knife kit of Embodiment 9, wherein the second and third bearing pivots are selectively interchangeable without removal of the first bearing pivot or the blade from the handle.

Embodiment 11: A folding knife that is selectively convertible between a manual function and an automatic function, comprising: a handle having a bearing aperture that opens to an exterior of the handle and that is configured to selectively and alternately receive a first function assembly and a second function assembly from the exterior of the handle, the first function assembly being configured to provide the folding knife with the manual function and the second function assembly being configured to provide the folding knife with the automatic function.

Embodiment 12: The folding knife of Embodiment 11, wherein the bearing aperture in the handle is configured to receive a biasing member therein when the second function assembly is received within the bearing aperture.

Embodiment 13: The folding knife of Embodiment 11, wherein the handle is formed as a one piece construction.

Embodiment 14: The folding knife of Embodiment 13, wherein the handle comprises a spine and a molded component that is cast or injection molded around at least a portion of the spine.

Embodiment 15: A method for selectively converting a folding knife between a manual function and an automatic function, comprising: removing a first bearing pivot from a bearing aperture in a knife handle, the first bearing pivot being removed from an opening in the bearing aperture, the opening in the bearing aperture opening to an exterior of the knife handle; inserting a biasing member into the bearing aperture, the biasing member being inserted into the bearing aperture from the exterior of the knife handle and through the opening in the bearing aperture; and inserting the first bearing pivot or a second bearing pivot into the bearing aperture, the first bearing pivot or the second bearing pivot being inserted into the bearing aperture from the exterior of the knife handle and through the opening in the bearing aperture.

Embodiment 16: The method of Embodiment 15, further comprising disconnecting the first bearing pivot from a third bearing pivot prior to or as part of removing the first bearing pivot.

Embodiment 17: The method of Embodiment 16, further comprising connecting the first bearing pivot or the second bearing pivot to the third bearing pivot after or as part of inserting the first bearing pivot or the second bearing pivot into the bearing aperture.

Embodiment 18: The method of Embodiment 15, further comprising removing a bearing ring from the bearing aperture after removing the first bearing pivot from the bearing aperture.

Embodiment 19: The method of Embodiment 15, further comprising keying the biasing member to the first bearing pivot or the second bearing pivot and a blade of the knife.

Embodiment 20: The method of Embodiment 15, further comprising removing the first bearing pivot or the second bearing pivot and the biasing member from the bearing aperture through the opening and inserting the first bearing aperture into the bearing aperture through the opening.

Embodiment 21: A folding knife, comprising: a handle having first and second bearing apertures that open to an exterior of the handle; a blade disposable at least partially within the handle and between the first and second bearing apertures; and first and second bearing pivots that are selectively insertable respectively into the first and second bearing apertures from the exterior of the handle, each of the first and second bearing pivots comprises a thrust bearing surface, and at least one of the first and second bearing pivots comprises a radial bearing surface about which the blade is configured to rotate.

Embodiment 22: The folding knife of Embodiment 21, wherein the first and second bearing pivots comprise complimentary threaded surfaces configured to selectively connect the first and second bearing pivots together.

Embodiment 23: The folding knife of Embodiment 21, wherein the first and second bearing pivots are configured to be selectively connected together with a fastener.

Embodiment 24: The folding knife of Embodiment 21, further comprising a biasing member positionable between the blade and at least one of the first and second bearing pivots.

Embodiment 25: The folding knife of Embodiment 21, further comprising a ball bearing ring positionable between the blade and at least one of the first and second bearing pivots.

Embodiment 26: The folding knife of Embodiment 21, wherein the thrust bearing surfaces engage directly with opposing sides of the knife.

Embodiment 27: The folding knife of Embodiment 21, further comprising a lock mechanism including a lock pin, the lock pin being selectively retained within the handle by one of the first and second bearing pivots.

Embodiment 28: The folding knife of Embodiment 27, wherein the lock mechanism further comprises a biasing member that is configured to urge the lock pin to a locked position.

Embodiment 29: The folding knife of Embodiment 28 wherein the lock pin comprises a recess configured to receive at least a portion of the biasing member therein.

Embodiment 30: The folding knife of Embodiment 29, wherein the lock pin further comprises a notch configured to allow for rotation of the blade when the lock pin in moved to an unlock or disengaged position.

Embodiment 31: The folding knife of Embodiment 30, wherein the recess and the notch are offset from one another along a longitudinal axis of the lock pin.

Embodiment 32: The folding knife of Embodiment 30, wherein the recess and the notch at least partially overlap one another along a longitudinal axis of the lock pin.

Embodiment 33: The folding knife of Embodiment 27, wherein the lock pin comprises a retention notch configured to engage one of the first and second bearing pivots to retain the lock pin in the handle.

Embodiment 34: The folding knife of Embodiment 27, wherein the lock pin is keyed to one of the first and second bearing pivots to limit or prevent rotation of the lock pin.

Embodiment 35: The folding knife of Embodiment 21, wherein the handle comprises a spine and a molded component that is cast or molded about at least a portion of the spine.

Embodiment 36: The folding knife of Embodiment 21, wherein the blade comprises one or more locating features disposed at a predetermined position, distance from and/or along a cutting edge of the blade, and/or orientation relative to the cutting edge of the blade, the one or more locating features being configured to have a sharpening guide attached thereto such that the guide holds the blade at a predetermined orientation.

Embodiment 37: The folding knife of Embodiment 21, wherein a lateral position of the blade within the handle is dictated by a position of one of the thrust bearing surfaces of the first and second bearing pivots.

Embodiment 38: The folding knife of Embodiment 37, wherein the position of the one of the thrust bearing surfaces is dictated by engagement between an exterior facing surface on the handle and a surface on the bearing pivot with the one of the thrust bearing surfaces.

Embodiment 39: The folding knife of Embodiment 21, wherein a lateral position of the blade relative to the handle is not referenced or determined relative to an interior surface of the handle Embodiment 40: A folding knife kit, comprising: a handle having first and second bearing apertures that open to an exterior of the handle; a blade disposable at least partially within the handle and between the first and second bearing apertures; a first bearing pivot assembly comprising first and second bearing pivots that are insertable respectively into the first and second bearing apertures, each of the first and second bearing pivots comprises a thrust bearing surface, and at least one of the first and second bearing pivots comprises a radial bearing surface about which the blade is configured to rotate; and a second bearing pivot assembly comprising third and fourth bearing pivots and a biasing member, the third and fourth bearing pivots are insertable respectively into the first and second bearing apertures, each of the third and fourth bearing pivots comprises a thrust bearing surface, and at least one of the third and fourth bearing pivots comprises a radial bearing surface about which the blade is configured to rotate, the biasing member being connectable between the blade one of the third and fourth bearing pivots, the biasing member being configured to automatically deploy the blade from a closed position to an open position.

Embodiment 41: The folding knife kit of Embodiment 40, wherein the first and third bearing pivots are the same bearing pivot.

Embodiment 42: The folding knife kit of Embodiment 40, further comprising one or more bearing rings.

Embodiment 43: The folding knife kit of Embodiment 42, wherein the one or more bearing rings comprises a first bearing ring disposable between the thrust bearing surface of the first bearing pivot and a first surface of the blade, and a second bearing ring disposable between the thrust bearing surface of the second bearing pivot and a second surface of the blade.

Embodiment 44: The folding knife kit of Embodiment 40, wherein the thrust bearing surfaces of the first and second bearing pivots are configured to directly engage opposing sides of the blade.

Embodiment 45: The folding knife kit of Embodiment 40, wherein the second bearing pivot assembly further comprises a biasing member.

Embodiment 46: The folding knife kit of Embodiment 45, wherein the biasing member is positional between the fourth bearing pivot and the blade.

Embodiment 47: A knife kit, comprising: a knife comprising a blade having one or more alignment features; and a sharpening guide comprising one or more guide alignment features that correspond to the one or more alignment features on the blade and one or more guide surfaces.

Embodiment 48: The knife kit of Embodiment 47, wherein the one or more alignment features on the blade are disposed at a predetermined position, distance from and/or along a cutting edge of the blade, and/or orientation relative to the cutting edge of the blade.

Embodiment 49: The knife kit of Embodiment 47, wherein engagement of the one or more alignment features of the sharpening guide with the one or more alignment features on the blade is configured to cause the sharpening guide to hold the blade at a predetermined orientation relative to the one or more guide surfaces.

Embodiment 50: The knife kit of Embodiment 47, wherein the sharpening guide first and second halves that are hingedly connected together.

Embodiment 51: A folding knife, comprising: a handle comprising: first and second bearing apertures that open to an exterior of the handle; and a slot therein with opposing interior surfaces; a blade disposable at least partially within the slot in the handle and between the first and second bearing apertures; and first and second bearing pivots that are selectively insertable respectively into the first and second bearing apertures from the exterior of the handle, each of the first and second bearing pivots comprises a thrust bearing surface, at least one of the thrust bearing surfaces being configured to dictate a lateral position of the blade between the interior surfaces of the slot.

Embodiment 52: The folding knife of Embodiment 51, wherein the lateral position of the blade within the slot is not dictated by the interior surfaces of the slot.

Embodiment 53: The folding knife of Embodiment 51, further comprising a compliant member positionable between the handle and the first and second bearing pivots.

Embodiment 54: The folding knife of Embodiment 53, wherein the compliant member is configured to compensate for tolerance differences between the handle and the first and second bearing pivots.

Embodiment 55: The folding knife of Embodiment 53, wherein the compliant member is configured to deform to allow for selective adjustment of a pivoting action of the blade.

Embodiment 56: The folding knife of Embodiment 51, wherein at least one of the thrust bearing surfaces is configured to extend into the slot in the handle to engage a surface of the blade.

Embodiment 57: The folding knife of Embodiment 56, wherein both thrust bearing surfaces of the first and second bearing pivots are configured to extend into the slot in the handle to engage opposing sides of the blade.

Embodiment 58: The folding knife of Embodiment 51, further comprising a bearing ring disposable between the thrust bearing surface of the first bearing pivot and a side of the blade.

Embodiment 59: The folding knife of Embodiment 58, further comprising a bearing ring disposable between the thrust bearing surface of the second bearing pivot and a second side of the blade.

Embodiment 60: The folding knife of Embodiment 51, wherein the first and second bearing pivots comprise complimentary threaded surfaces configured to selectively connect the first and second bearing pivots together.

Embodiment 61: The folding knife of Embodiment 51, wherein the first and second bearing pivots are selectively connectable together with a fastener.

Embodiment 61: A folding knife that is selectively convertible between a first bearing pivot and a second bearing pivot to selectively change the action and/or function of the knife, the knife comprising: a handle having a bearing aperture that opens to an exterior side of the handle and that is configured to selectively and alternately receive the first bearing pivot and the second bearing pivot from the exterior of the handle, the handle comprising a slot; and a blade disposable within the slot in the handle and configured to be selectively movable about an axis between an open position extending from the handle and a closed position at least partially within the handle, wherein the first bearing pivot and the second bearing pivot are each configured to extend into the bearing aperture about the axis and towards a side of the blade.

Embodiment 63: The folding knife of Embodiment 62, wherein the first bearing pivot comprises a thrust bearing surface configured to directly engage the side of the blade to provide a first action, wherein the second bearing pivot is configured to engage a bearing ring disposed between the second bearing pivot and the side of the blade to provide a second action.

Embodiment 64: The folding knife of Embodiment 63, wherein the bearing aperture is a first bearing aperture on a first side of the handle, the handle further comprising a second bearing aperture that opens to the exterior of a second side of the handle, the second bearing aperture being configured to selectively and alternately receive a third bearing pivot and a fourth bearing pivot therein.

Embodiment 65: The folding knife of Embodiment 64, wherein the third bearing pivot is configured to directly engage a second side of the blade and the fourth bearing pivot is configured to engage a second bearing ring between the fourth bearing pivot and the second side of the blade.

Embodiment 66: The folding knife of Embodiment 62, wherein the first bearing pivot comprises a thrust bearing surface, wherein the second bearing pivot is part of a function assembly that comprises the second bearing pivot and a bias member, the bias member being configured to engage the second bearing pivot and the blade to bias the blade about the axis towards the open position, wherein the first bearing pivot provides a manual function and the function assembly provides an automatic function.

Embodiment 67: The folding knife of Embodiment 66, wherein the first bearing pivot and the second bearing pivot are the same bearing pivot.

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

What is claimed is:

1. A folding knife kit, comprising:
   a handle having first and second bearing apertures that open to an exterior of the handle;
   a blade disposable at least partially within the handle and between the first and second bearing apertures;
   a first bearing pivot insertable within and removable from the first bearing aperture from the exterior of the handle, the first bearing pivot comprising a thrust bearing surface;
   a second bearing pivot insertable within and removable from the second bearing aperture from the exterior of the handle, the second bearing pivot comprising a thrust bearing surface; and
   a third bearing pivot and a biasing member insertable within and removable from the second bearing aperture from the exterior of the handle in place of the second bearing pivot, the third bearing pivot comprising a thrust bearing surface, and the biasing member being keyable to the blade and the third bearing pivot to bias the blade to an open position.

2. The folding knife kit of claim 1, wherein the first bearing pivot comprises a radial bearing surface about which the blade is configured to rotate.

3. The folding knife kit of claim 1, wherein the first bearing pivot is selectively and alternately connectable to the second bearing pivot and the third bearing pivot.

4. The folding knife kit of claim 3, wherein the first bearing pivot comprises a first connection feature and the second bearing pivots comprises a corresponding second connection feature that is configured for selective connection to the first connection feature.

5. The folding knife kit of claim 3, wherein the first bearing pivot is selectively and alternately connectable to the second bearing pivot and the third bearing pivot with a fastener.

6. The folding knife kit of claim 1, wherein the thrust bearing surface of the first bearing pivot is configured to directly engage a surface of the blade.

7. The folding knife kit of claim 1, further comprising a bearing ring disposable between the thrust bearing surface of the first bearing pivot and a side of the blade.

8. The folding knife kit of claim 1, wherein the thrust bearing surface of the second bearing pivot is configured to directly engage a surface of the blade.

9. The folding knife kit of claim 1, wherein:
   a bearing ring is configured to be disposed between the thrust bearing surface of the first bearing pivot; and
   the thrust bearing surface of the third bearing pivot is configured to engage directly with a side of the blade.

10. The folding knife kit of claim 9, wherein the second and third bearing pivots are selectively interchangeable without removal of the first bearing pivot or the blade from the handle.

11. A folding knife that is selectively convertible between a manual function and an automatic function, comprising:
    a handle having a bearing aperture that opens to an exterior of the handle and that is configured to selectively and alternately receive a first function assembly and a second function assembly from the exterior of the handle, the first function assembly being configured to provide the folding knife with the manual function and the second function assembly being configured to provide the folding knife with the automatic function.

12. The folding knife of claim 11, wherein the bearing aperture in the handle is configured to receive a biasing member therein when the second function assembly is received within the bearing aperture.

13. The folding knife of claim 11, wherein the handle is formed as a one piece construction.

14. The folding knife of claim 13, wherein the handle comprises a spine and a molded component that is cast or injection molded around at least a portion of the spine.

15. A method for selectively converting a folding knife between a manual function and an automatic function, comprising:
- removing a first bearing pivot from a bearing aperture in a knife handle, the first bearing pivot being removed from an opening in the bearing aperture, the opening in the bearing aperture opening to an exterior of the knife handle;
- removing a bearing ring from the bearing aperture after removing the first bearing pivot from the bearing aperture;
- inserting a biasing member into the bearing aperture, the biasing member being inserted into the bearing aperture from the exterior of the knife handle and through the opening in the bearing aperture; and
- inserting a second bearing pivot into the bearing aperture, the second bearing pivot being inserted into the bearing aperture from the exterior of the knife handle and through the opening in the bearing aperture.

16. The method of claim 15, further comprising disconnecting the first bearing pivot from a third bearing pivot prior to or as part of removing the first bearing pivot.

17. The method of claim 16, further comprising connecting the second bearing pivot to the third bearing pivot after or as part of inserting the second bearing pivot into the bearing aperture.

18. The method of claim 15, further comprising keying the biasing member to the second bearing pivot and a blade of the knife.

19. The method of claim 15, further comprising removing the second bearing pivot and the biasing member from the bearing aperture through the opening and inserting the first bearing pivot into the bearing aperture through the opening.

* * * * *